United States Patent
Lesonen et al.

(10) Patent No.: US 11,669,088 B2
(45) Date of Patent: Jun. 6, 2023

(54) APPARATUS, METHOD AND SOFTWARE FOR ASSISTING HUMAN OPERATOR IN FLYING DRONE USING REMOTE CONTROLLER

(71) Applicant: ANARKY LABS OY, Helsinki (FI)

(72) Inventors: Hannu Lesonen, Helsinki (FI); Lassi Immonen, Helsinki (FI)

(73) Assignee: ANARKY LABS OY, Helsinki (FI)

( * ) Notice: Subject to any disclaimer, the term of this patent is extended or adjusted under 35 U.S.C. 154(b) by 0 days.

(21) Appl. No.: 17/675,028

(22) Filed: Feb. 18, 2022

(65) Prior Publication Data

US 2022/0269267 A1    Aug. 25, 2022

(30) Foreign Application Priority Data

Feb. 19, 2021   (EP) .................................... 21158161

(51) Int. Cl.
| | | |
|---|---|---|
| G05D 1/00 | (2006.01) | |
| B64C 39/02 | (2023.01) | |
| B64U 101/00 | (2023.01) | |
| G06T 11/00 | (2006.01) | |
| H04N 7/18 | (2006.01) | |

(52) U.S. Cl.
CPC ......... *G05D 1/0038* (2013.01); *B64C 39/024* (2013.01); *G05D 1/0022* (2013.01); *G06T 11/00* (2013.01); *H04N 7/183* (2013.01); *B64U 2101/00* (2023.01); *B64U 2201/20* (2023.01)

(58) Field of Classification Search
CPC .. G05D 1/0038; G05D 1/0022; B64C 39/024; B64C 2201/12; B64U 2101/00
See application file for complete search history.

(56) References Cited

U.S. PATENT DOCUMENTS

| | | | | |
|---|---|---|---|---|
| 9,164,506 | B1* | 10/2015 | Zang | ........................ G05D 1/12 |
| 9,567,078 | B2* | 2/2017 | Zang | .................... G08G 5/0069 |
| 9,846,429 | B2* | 12/2017 | Zang | .................... G08G 5/0069 |
| 10,310,502 | B2* | 6/2019 | Kobayashi | ............ B64C 39/024 |
| 10,488,860 | B1* | 11/2019 | Koch | .................. G06F 16/9537 |
| 10,678,238 | B2* | 6/2020 | Moeller | ................ G06T 19/006 |
| 11,043,038 | B1* | 6/2021 | Ngai | ...................... G06T 7/246 |

(Continued)

OTHER PUBLICATIONS

YouTube—AWO 2 SV4GF VRR HPTE Citrus CAS Event, "Synthetic Vision for Ground Forces HPT&E Fall Technical Review 2020", Sep. 16, 2020, 2 pages. https://www.youtube.com/watch?v=ykrUJzjbAMo.

(Continued)

*Primary Examiner* — Luis A Martinez Borrero
(74) *Attorney, Agent, or Firm* — Nixon & Vanderhye PC

(57) ABSTRACT

Apparatus, method, and software for assisting human operator in flying drone using remote controller. The apparatus includes an internal data communication interface configured to receive data from the remote controller, an augmented reality display configured to display the data, one or more memories including computer program code, and one or more processors to cause the apparatus to: superimpose, on the augmented reality display, a target symbol indicating a position of the drone while the human operator is looking towards the drone; and superimpose, on the augmented reality display, an orientation symbol indicating an orientation of the drone while the human operator is looking towards the drone.

23 Claims, 17 Drawing Sheets

(56) References Cited

U.S. PATENT DOCUMENTS

| | | | |
|---|---|---|---|
| 11,106,201 B2* | 8/2021 | Zang | G05D 1/0088 |
| 11,153,503 B1* | 10/2021 | Ebrahimi Afrouzi | H04N 23/74 |
| 11,194,323 B2* | 12/2021 | Zang | G06T 7/70 |
| 11,235,871 B2* | 2/2022 | Liu | G05D 1/101 |
| 11,409,280 B1* | 8/2022 | Lesonen | G06T 11/00 |
| 2011/0221692 A1* | 9/2011 | Seydoux | G06F 3/04883 345/173 |
| 2015/0142213 A1* | 5/2015 | Wang | G05D 1/0016 701/2 |
| 2015/0348321 A1* | 12/2015 | Rossini | G02B 27/0103 345/633 |
| 2016/0031559 A1* | 2/2016 | Zang | G05D 1/12 701/2 |
| 2016/0048230 A1* | 2/2016 | Shimoda | H04N 13/156 345/633 |
| 2016/0249989 A1* | 9/2016 | Devam | G09B 5/02 345/633 |
| 2016/0313732 A1* | 10/2016 | Seydoux | H04L 67/12 |
| 2016/0320863 A1* | 11/2016 | Shimoda | G06F 3/038 |
| 2016/0327946 A1* | 11/2016 | Koga | G06T 19/006 |
| 2017/0023938 A1* | 1/2017 | Zang | G05D 1/0011 |
| 2017/0068246 A1* | 3/2017 | Zang | B64C 39/024 |
| 2017/0108877 A1* | 4/2017 | Zang | G06F 3/04883 |
| 2017/0183105 A1* | 6/2017 | Fournier | G06T 11/60 |
| 2017/0186203 A1* | 6/2017 | Fournier | G09B 29/006 |
| 2017/0262045 A1* | 9/2017 | Rouvinez | G06F 3/011 |
| 2017/0322551 A1* | 11/2017 | Zang | G05D 1/0011 |
| 2018/0032071 A1* | 2/2018 | Wieneke | G05D 1/0038 |
| 2018/0164114 A1* | 6/2018 | Chiu | G01C 21/3697 |
| 2018/0164115 A1* | 6/2018 | Chiu | G01C 21/3602 |
| 2018/0196425 A1* | 7/2018 | Kobayashi | B64C 39/024 |
| 2019/0011908 A1* | 1/2019 | Liu | G05D 1/0038 |
| 2019/0049949 A1* | 2/2019 | Moeller | G02B 27/017 |
| 2019/0077504 A1 | 3/2019 | Chapman et al. | |
| 2019/0088025 A1* | 3/2019 | Tamanaha | H04N 21/2187 |
| 2020/0045416 A1* | 2/2020 | Kamio | G01H 3/125 |
| 2020/0225660 A1* | 7/2020 | Koch | G01C 21/3841 |
| 2020/0346750 A1* | 11/2020 | Hu | G05D 1/106 |
| 2021/0018911 A1* | 1/2021 | Nakazawa | G05D 1/0038 |
| 2021/0191390 A1* | 6/2021 | Hwang | G08G 5/0086 |
| 2021/0304624 A1* | 9/2021 | Mizufuka | G02B 27/0172 |
| 2022/0091607 A1* | 3/2022 | Zang | G05D 1/0094 |
| 2022/0091608 A1* | 3/2022 | Feng | G06V 20/17 |
| 2022/0153412 A1* | 5/2022 | Liu | G05D 1/0022 |
| 2022/0269266 A1* | 8/2022 | Lesonen | G06T 11/00 |

OTHER PUBLICATIONS

VRR VR Rehab Inc—Winner of the 2018 I/ITSEC Best Paper in Emerging Concepts & Innovative Technology, electronically retrieved Dec. 27, 2021, 3 pages. https://vrrehab.com/.

Extended European Search Report for EP21158161.6 dated Aug. 6, 2021, 11 pages.

* cited by examiner

APPARATUS, METHOD AND SOFTWARE FOR ASSISTING HUMAN OPERATOR IN FLYING DRONE USING REMOTE CONTROLLER

This application claims priority to EP Patent Application No. 21158161.6 filed Feb. 19, 2021, the entire contents of each of which are hereby incorporated by reference.

FIELD

Various embodiments relate to an apparatus for assisting a human operator in flying a drone using a remote controller, a method for assisting the human operator in flying the drone using the remote controller, and a computer-readable medium comprising computer program code, which, when executed by one or more processors, causes performance of the method.

BACKGROUND

A (ground-based) human operator flies a drone (or an unmanned aerial vehicle, UAV) using a remote controller (sometimes at least partly assisted by an autopilot).

The human operator has to simultaneously look towards the drone in the air, operate the hand-held remote controller, and occasionally look towards a display of the remote controller. This leads to poor situational awareness, causing potentially hazardous situations.

A legal requirement is that the human operator must maintain a visual contact (by a line of sight) to the drone in the air. This is quite challenging as the drone may not be visible due to a long distance, low ambient light, or a physical obstacle, for example.

These problems may be mitigated by another person, a so-called spotter, retaining the visual contact to the drone, even using binoculars, whereas the human operator may concentrate on operating the remote controller (but may still need to check occasionally the display of the remote controller). Naturally, such a setup requires good communication skills for the human operator and the spotter. Additionally, the manual labour is doubled, leading to higher operation costs for the drone.

BRIEF DESCRIPTION

According to an aspect, subject matter of independent claims is provided. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIG. 1A and FIG. 1B illustrate embodiments of an apparatus for assisting a human operator in flying a drone using a remote controller;

FIG. 2 and FIG. 3 illustrate embodiments of views offered by an augmented reality display of the apparatus;

FIG. 4, FIG. 5, FIG. 6, FIG. 7, FIG. 8, and FIG. 9 illustrate embodiments of an orientation of the drone;

FIG. 10, FIG. 11, and FIG. 12 illustrate embodiments of visualizing an obstacle in relation to the drone;

Figure 20:
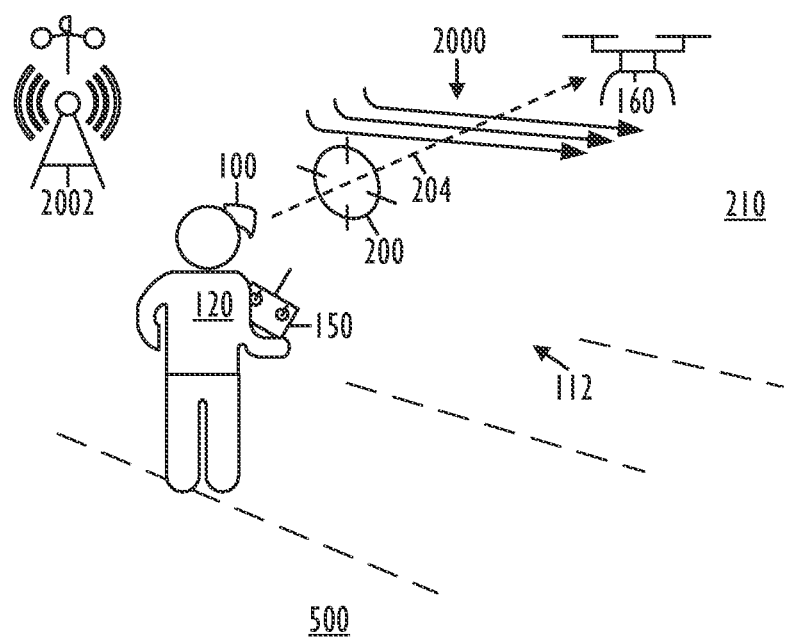
Figure 21:
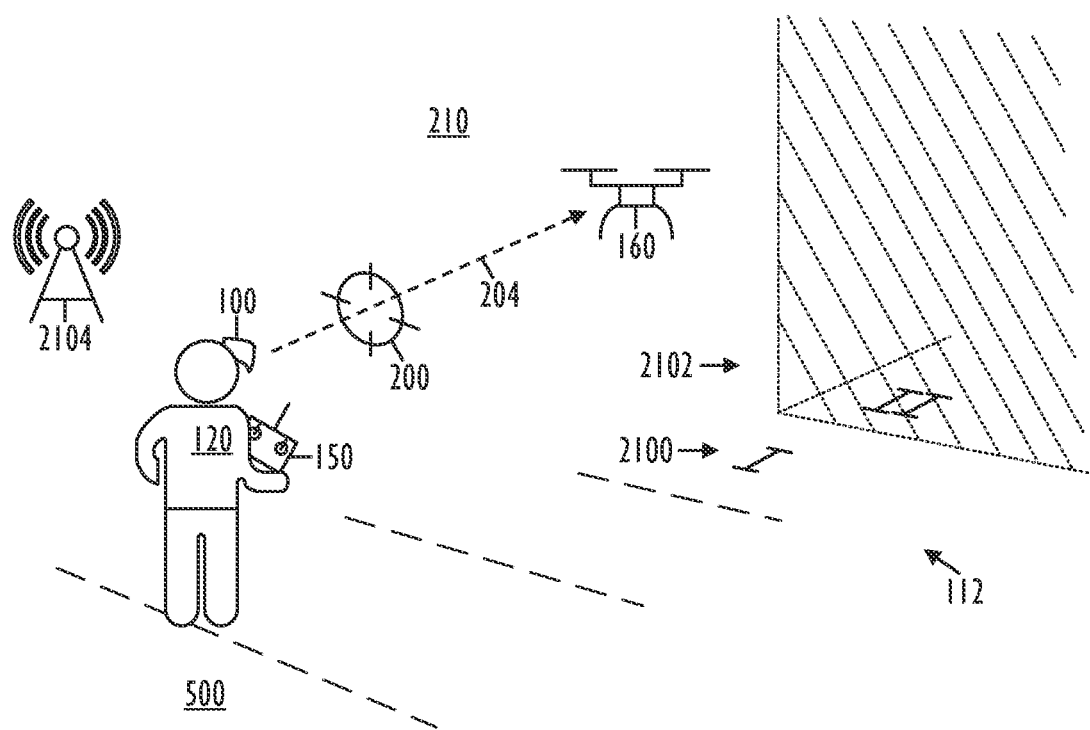
Figure 22:
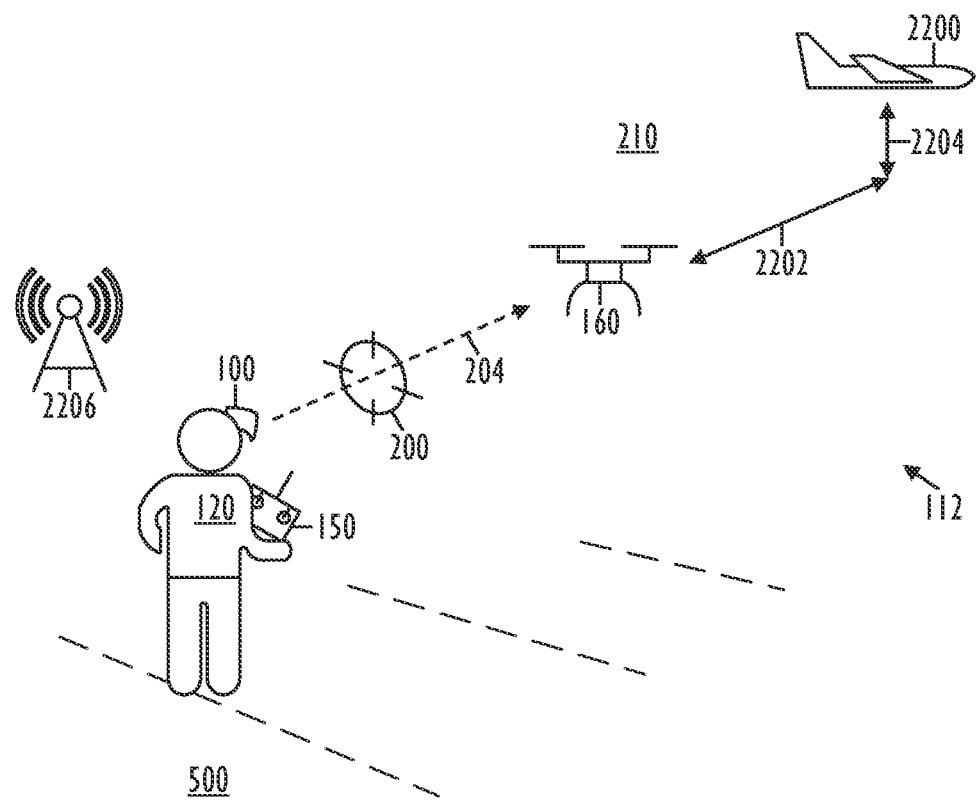
Figure 28:
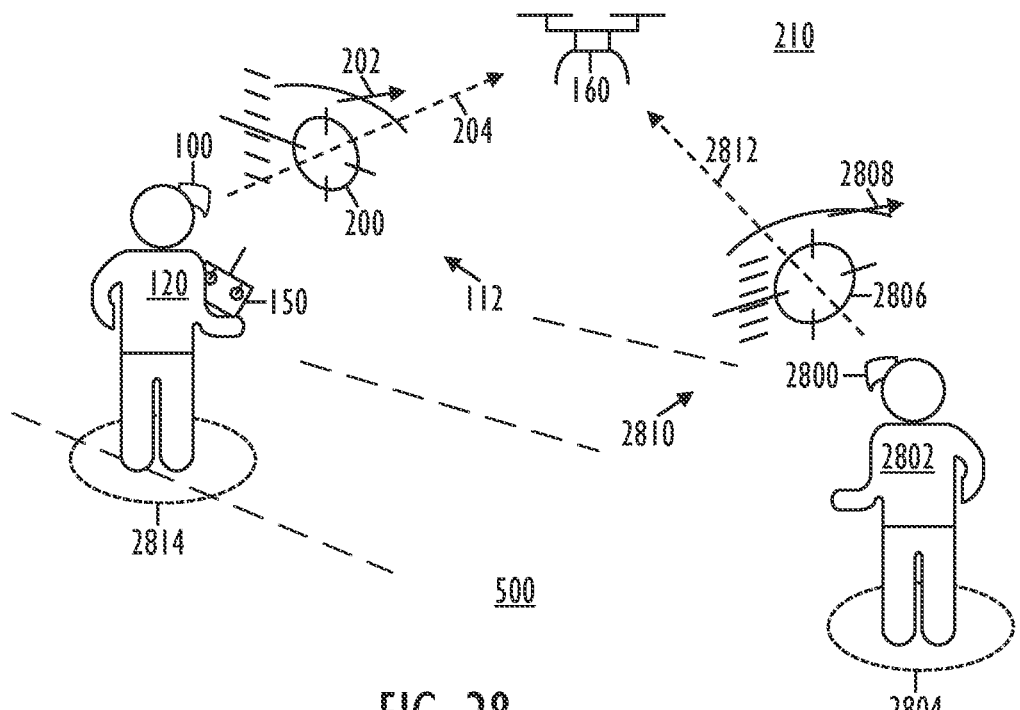
Figure 29:
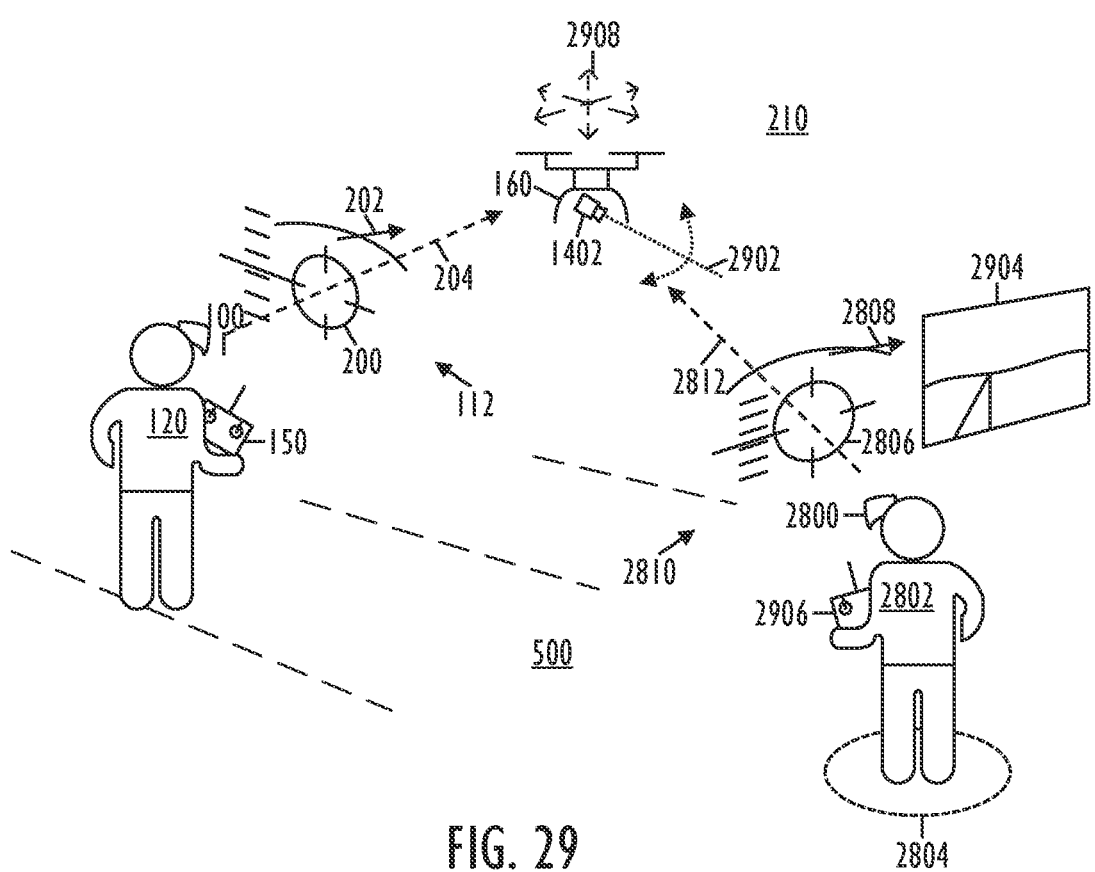
Figure 30:
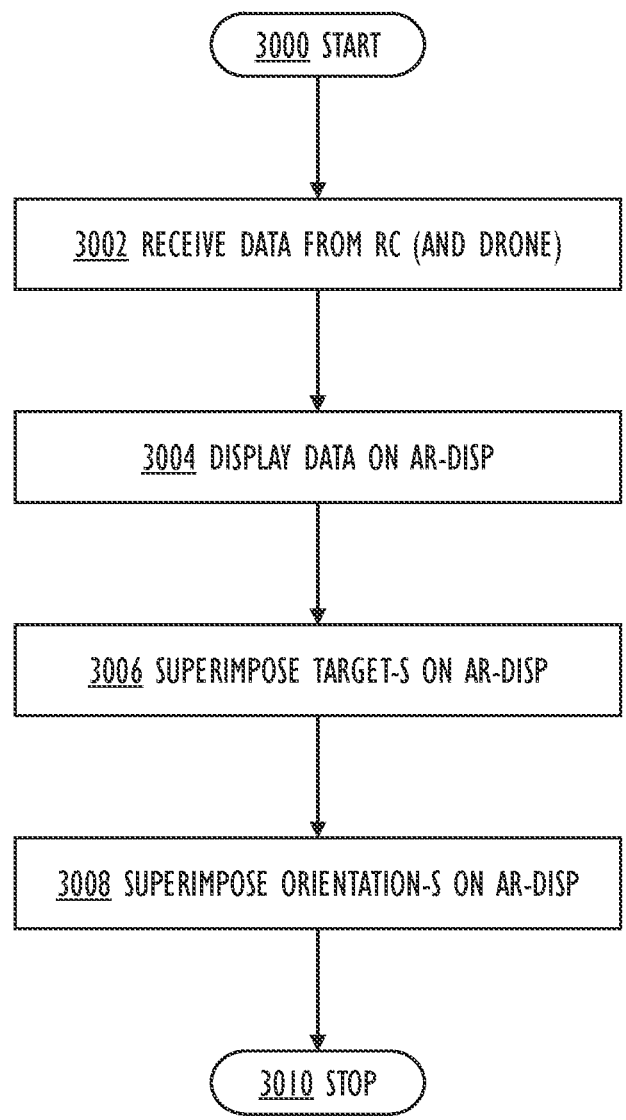

FIG. 20, FIG. 21, and FIG. 22 illustrate embodiments of visualizing external data related to a physical environment of the drone;

FIG. 23, FIG. 24, FIG. 25, FIG. 26, and FIG. 27 illustrate embodiments of visualizing a line of sight to the drone during different visibilities;

FIG. 28 and FIG. 29 illustrate embodiments of a system comprising two apparatuses; and FIG. 30 is a flow chart illustrating embodiments of a method for assisting the human operator in flying the drone using the remote controller.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Figure 1A:
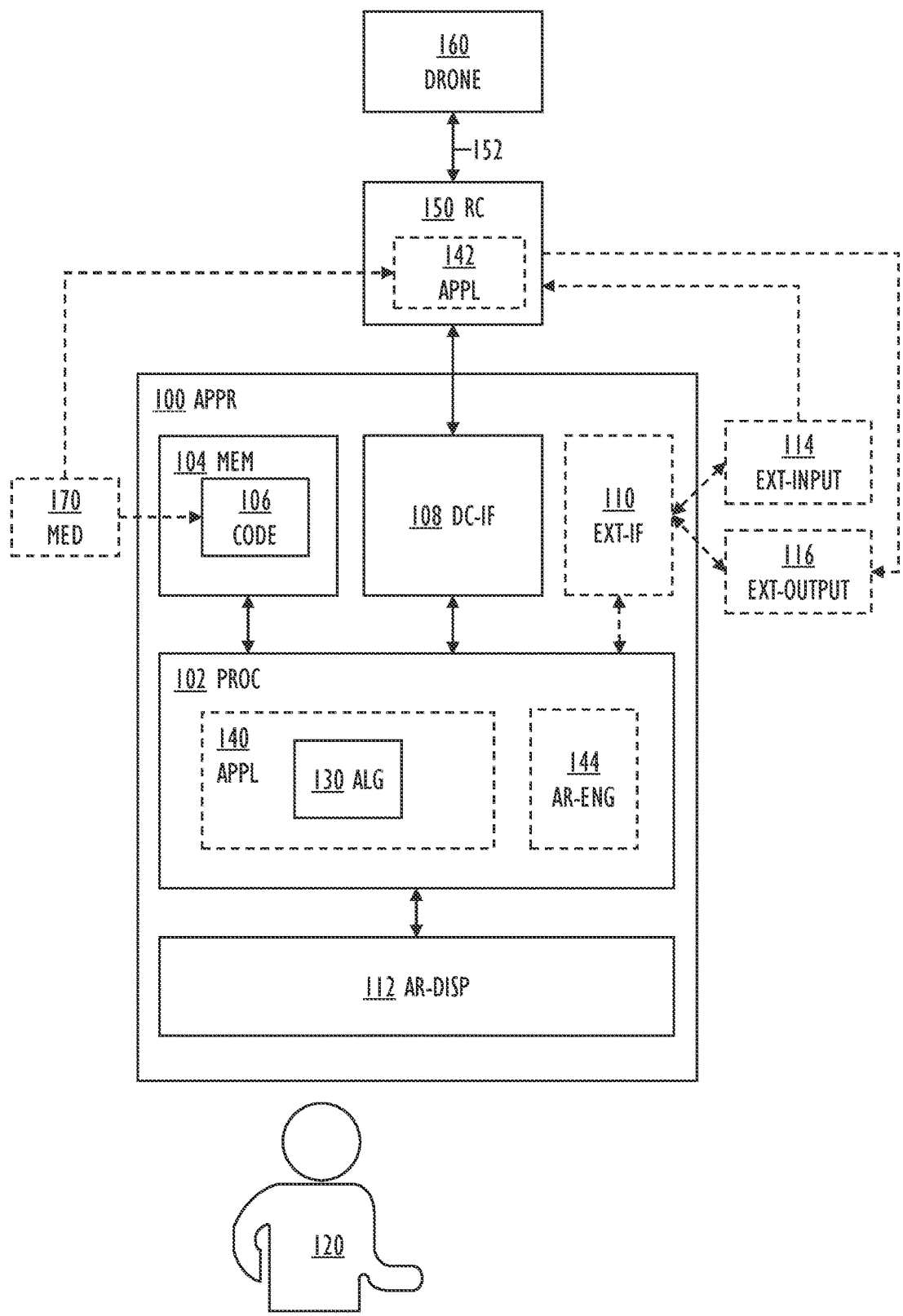

Let us study FIG. 1A, which illustrates a simplified block diagram of an apparatus 100 for assisting a human operator (or pilot) 120 in flying a drone 160 using a remote controller 150. The drone 160 is also known as a UAV (unmanned aerial vehicle). A UAS (unmanned aircraft system) may be defined as including the drone (or UAV) 160, the (ground-based) remote controller 150, and a wireless communications system 152 between the remote controller 150 and the drone 160.

Simultaneously, FIG. 30, which is a flow chart illustrating embodiments of a method for assisting the human operator 120 in flying the drone 160 using the remote controller 150, is referred to.

The method starts in 3000 and ends in 3010. Note that the method may run as long as required (after the start-up of the apparatus 100 until switching off) by looping back to an operation 3002.

The operations are not strictly in chronological order in FIG. 30, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The apparatus 100 comprises an internal data communication interface 108 configured to receive 3002 data related to the flying from the remote controller 150. The data related to the flying may include telemetry data of the drone 160. The data related to the flying may include, but is not limited to: sensor readings such as gyroscope and magnetometer, angular rate, velocity, fusion data such as altitude and global position, aircraft information such as battery, gimbal, and flight status, etc. Note that depending on the drone environment, some data may also be received by the apparatus 100 directly from the drone 160.

The internal data communication interface 108 may be implemented using a wireless radio transceiver configured to communicate with a wireless transceiver of the remote controller 150. The technologies for the internal data communication interface 108 include, but are not limited to one or more of the following: a wireless local area network (WLAN) implemented using an IEEE 802.11ac standard or a Wi-Fi protocol suite, a short-range radio network such as Bluetooth or Bluetooth LE (Low Energy), a cellular radio network employing a subscriber identity module (SIM) or an eSIM (embedded SIM), or another standard or proprietary wireless connectivity means. Note that in some use cases, the internal data communication interface 108 may additionally or alternatively utilize a standard or proprietary wired connection such as an applicable bus, for example. An embodiment utilizes a wired connection according to the USB (Universal Serial Bus) standard.

The apparatus 100 also comprises an augmented reality (AR) display 112 configured to display 3004 the data related to the flying to the human operator 120. Note that the drawings from FIG. 2 to FIG. 29 show specific embodiments, but besides these, also various notifications and statuses related to the flying may be shown on the augmented reality display 112.

In the drawings, the augmented reality display 112 is implemented as a head-mounted display attached with a headband (or being a helmet-mounted) and worn as a visor in front of the eyes by the human operator 120. In the drawings, the augmented reality display 112 is implemented as a see through display on which holographic images are displayed. In an alternative embodiment, the augmented reality display 112 may employ cameras to intercept the real world view and display an augmented view of the real world as a projection.

In an embodiment, the apparatus 100 is implemented using Microsoft® HoloLens® 2 (or a later version) mixed reality smartglasses employing see-through holographic lenses as the augmented reality display 112, offering a complete development environment. The head-mounted apparatus 100 then includes the necessary processors (including a system on a chip, a custom-made holographic processing unit, and a coprocessor) 102, memories 104 and software 106, a depth camera, a video camera, projection lenses, an inertial measurement unit (including an accelerometer, a gyroscope, and a magnetometer), a wireless connectivity unit 108, 110, and a rechargeable battery. Note that some of these parts are not illustrated in FIG. 1. Such a ready-made environment offers an augmented reality engine 144 configured to provide the basic operations related to fusing the real world and the augmented reality together and tracking head and eye movements of the human operator 120, for example.

However, also other applicable implementations of the augmented reality display 112 may be used, including, but not limited to: eyeglasses, a head-up display, contact lenses with an augmented reality imaging, etc. For the purposes of the present embodiments, the augmented reality display 112 is configured to provide an interactive real-time experience of a real-world flying environment 210 and the drone 160 enhanced by computer-generated perceptual information. The data related to the flying is superimposed (or overlaid) in addition to the natural environment 210 and the drone 160.

The apparatus 100 also comprises one or more memories 104 including computer program code 106, and one or more processors 102 configured to execute the computer program code 106 to cause the apparatus 100 to perform required data processing. The data processing performed by the apparatus 100 may be construed as a method or an algorithm 130.

The term 'processor' 102 refers to a device that is capable of processing data. In an embodiment, the processor 102 is implemented as a microprocessor implementing functions of a central processing unit (CPU) on an integrated circuit. The CPU is a logic machine executing the computer program code 106. The CPU may comprise a set of registers, an arithmetic logic unit (ALU), and a control unit (CU). The control unit is controlled by a sequence of the computer program code 106 transferred to the CPU from the (working) memory 104. The control unit may contain a number of microinstructions for basic operations. The implementation of the microinstructions may vary, depending on the CPU design. The one or more processors 102 may be implemented as cores of a single processors and/or as separate processors.

The term 'memory' 104 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 106 is implemented by software. In an embodiment, the software may be written by a suitable programming language, and the resulting executable code may be stored in the memory 104 and executed by the one or more processors 102.

The computer program code 106 implements the method/algorithm 130. The computer program code 102 may be coded as a computer program (or software) using a programming language, which may be a high-level programming language, such as C, C++, or Rust, for example. The computer program code 106 may be in source code form, object code form, executable file, or in some intermediate form, but for use in the one or more processors 102 it is in an executable form as an application 140. There are many ways to structure the computer program code 106: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program code 106 for performing a wide variety of standard operations. In addition, an operating system (such as a general-purpose operating system) may provide the computer program code 106 with system services.

An embodiment provides a computer-readable medium 170 storing the computer program code 106, which, when loaded into the one or more processors 102 and executed by one or more processors 102, causes the one or more processors 102 to perform the method/algorithm 130 described in FIG. 30. The computer-readable medium 170 may comprise at least the following: any entity or device capable of carrying the computer program code 106 to the one or more processors 102, a record medium, a computer memory, a read-only memory, an electrical carrier signal, a telecommunications signal, and a software distribution medium. In some jurisdictions, depending on the legislation and the patent practice, the computer-readable medium 170 may not be the telecommunications signal. In an embodiment, the computer-readable medium 170 may be a computer-readable storage medium. In an embodiment, the computer-readable medium 170 may be a non-transitory computer-readable storage medium.

Figure 1B:
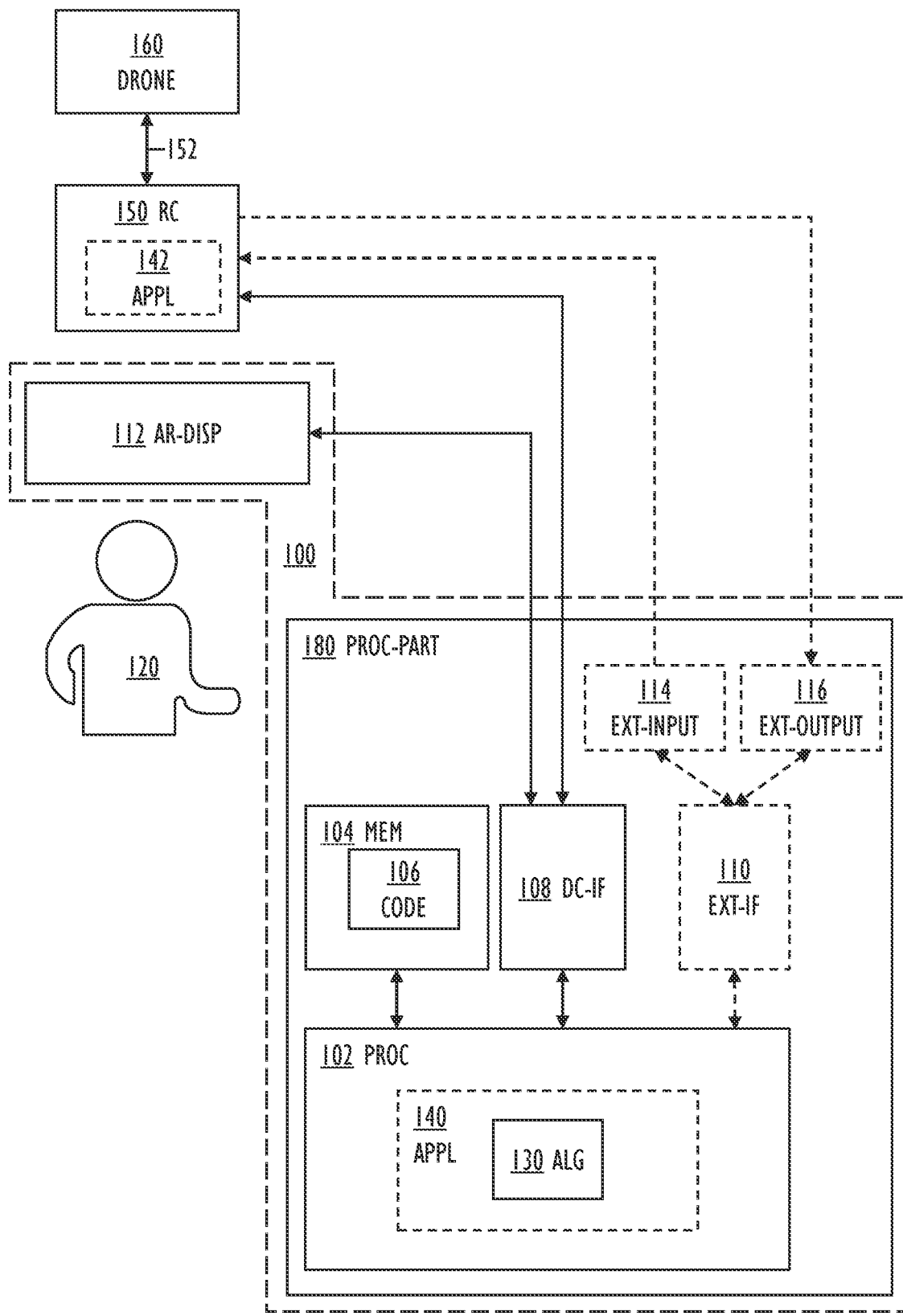

As shown in FIG. 1A and FIG. 1B, the computer-readable medium 170 may carry the computer program code 160 as the executable application 140 for the apparatus 100, and as an executable application 142 for the remote controller 150 to transmit the data related to the flying to the apparatus 100. In a typical drone environment, such as DJI®, a software development kit may be used for the application 142 to interface with the remote controller 150.

FIG. 1A illustrates the apparatus 100 as an integrated unit comprising the augmented reality display 112, the one or more memories 104 including the computer program code 106, and the one or more processors 102.

However, as illustrated in FIG. 1B, the apparatus 100 may also be implemented as a distributed apparatus 100 so that the human operator 120 is provided with the augmented reality display 112, but with a separate processing part 180, which is communicatively coupled with the augmented reality display 112 and the remote controller 150, and which comprises the one or more memories 104 including the computer program code 106, and the one or more processors 102. This may be implemented so that processing part 180 is a user apparatus such as a smartphone, tablet computer or a portable computer carried by the human operator 120, and the communication coupling may be wired or wireless. Another implementation is such that the processing part 180 is a networked computer server, which interoperates with the augmented reality display 112 according to a client-server architecture, a cloud computing architecture, a peer-to-peer system, or another applicable distributed computing architecture.

Figure 2:
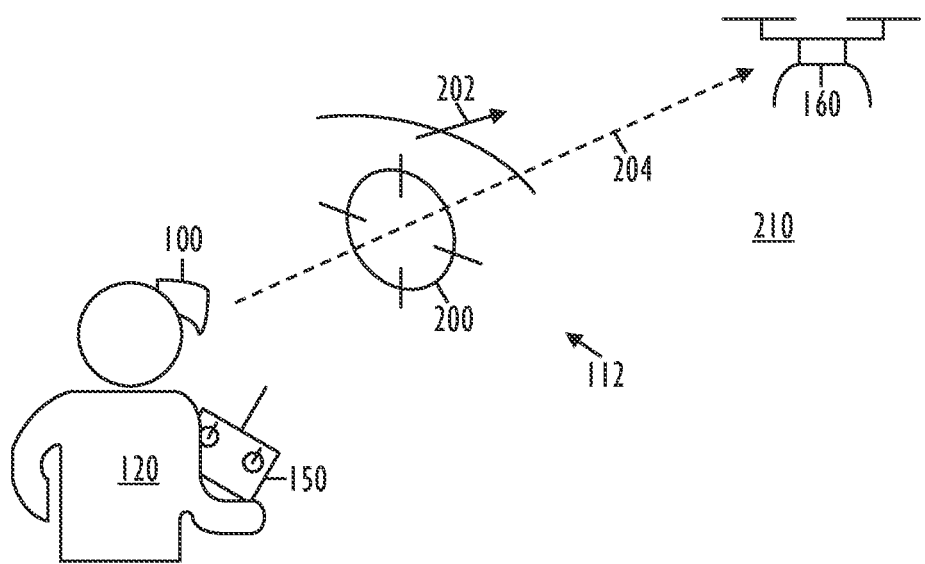
Figure 3:
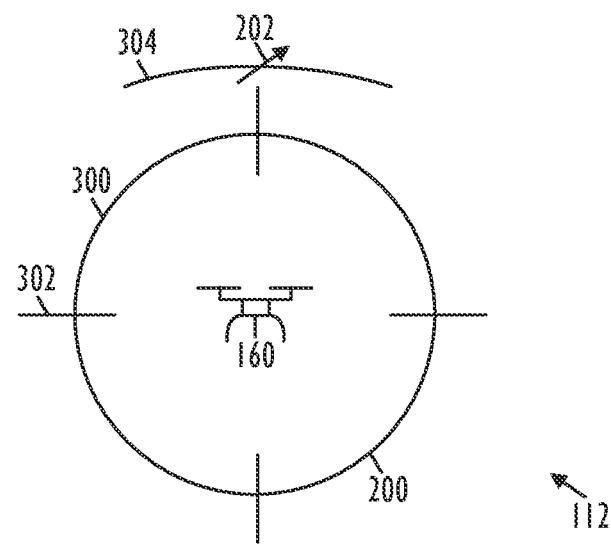
Figure 3:
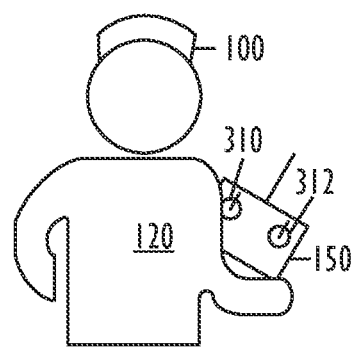

FIG. 2 and FIG. 3 illustrate embodiments of views offered by the augmented reality display 112 of the apparatus 100. Note that all drawings from FIG. 2 to FIG. 29 illustrate each use case as a combination of two different visual angles.

Let us examine FIG. 2 and FIG. 3 in more detail. As shown, a first visual angle illustrates the flying: the human operator 120 operates the remote controller 150 and observes (or looks towards) 204 the drone 160 in the air 210 through the apparatus 100, or, expressed more precise, through the augmented reality display 112 of the apparatus 100. As, shown, a second visual angle illustrates elements 200, 202 shown on the augmented reality display 112.

This convention is used in all drawings from FIG. 2 to FIG. 29: a dotted arrow line 204 shows the direction the human operator 120 is looking towards, normally towards the drone 160 in the air, but in some use cases, the human operator 120 is looking towards another direction such as towards the ground, the direction of gaze marked with dotted arrow lines referred to by reference signs 600, 1404, 1706, 1804, 2602. However, in the previously mentioned alternative embodiment using the cameras to intercept the real world view and display the augmented view of the real world as the projection, the direction of the gaze towards the augmented reality display 112 may differ from the capture direction of the cameras. For example, to ease the flying position, the human operator 120 need not tilt the head to gaze into the sky, but the cameras are tilted upwards.

Note that in all described embodiments, the human operator 120 is standing on the ground 500, and the drone 160 is flying in the air 210. However, the embodiments are also applicable to other kind of environments, such as flying the drone 160 in an underground cave, inside a man-made structure (such as a building or a tunnel), or even in such use cases where the drone 160 is flying below the human operator 120, i.e., the human operator 120, while looking 204 towards the drone 160, is looking down and not up. In such a use case, the human operator 120 may be standing on a high platform (such as a skyscraper or a mountain), and the drone 160 is flying below (such as above the streets or in a valley). The embodiments may also be applied to flying the drone 160 submersed, i.e., the drone 160 is then an unmanned underwater vehicle (UUV), and the human operator 120 may operate the drone 160 from the land or from a vessel, for example, while the drone is underwater in a river, lake, sea, water-filled mine or tunnel, etc.

In a way, all drawings from FIG. 2 to FIG. 29 are hybrids illustrating an augmented reality on top of the real world. The real world is illustrated from an external view (like a view of another person observing the use case from outside of the real world), whereas the augmented reality display 112 is illustrated from a first person view of the human operator 120.

Let us now return to FIG. 2 and FIG. 3. In an embodiment, the apparatus 100 is caused to superimpose 3006, on the augmented reality display 112, a target symbol 200 indicating a position of the drone 160 (in the air 210 for the UAV) while the human operator 120 is looking 204 towards the drone 160 (in the air 210 for the UAV). In an embodiment, the apparatus is also caused to superimpose 3008, on the augmented reality display 112, an orientation symbol 202 indicating an orientation of the drone 160 (in the air 210 for the UAV) while the human operator 120 is looking 204 towards the drone 160 (in the air 210 for the UAV).

The use of the augmented reality display 112 enables the human operator 120 to look 204 towards the drone 160 in the sky 210 during the flying. This improves the situational awareness of the human operator 120 regarding the flying, without needing the spotter. The human operator maintains a visual contact (by a line of sight) to the drone 160 in the air 210, but is also simultaneously shown aviation data in actual correct world positions as will be explained.

The target symbol 200 indicates the position of the drone 160 in the air 210, which makes it easier for the human operator 120 to track the drone 160 during the flying. In an embodiment, the target symbol 200 is a reticle as illustrated. The reticle 200 is commonly used in a telescopic sight of a firearm. The reticle 200 may include a combination of a circle 300 and a partial crosshair 302 as shown in FIG. 3, but also other patterns may be used such as dots, posts, chevrons, etc.

The orientation symbol 202 indicates the orientation of the drone 160 in the air 210, which makes it easier for the human operator 120 to understand an effect of the steering commands given with the remote controller 150 to the drone 160 during the flying. In an embodiment, the orientation symbol 202 is an arrow as illustrated. As shown in FIG. 3, the arrow 202 may be augmented by an arc 304, which illustrates a part of a 360 degrees circle around the human operator 120. The arrow 202 may point a heading of the drone 160 as will later be explained.

In the augmented reality display 112, the target symbol 200 and the orientation symbol 202 from the digital world blend into the human operator's 120 perception of the real world, through the integration of immersive sensations, which are perceived as natural parts of the flying environment 210.

Let us next study FIG. 4, FIG. 5, FIG. 6, FIG. 7, FIG. 8, and FIG. 9, which illustrate embodiments of an orientation of the drone 160.

In an embodiment, the orientation symbol 202 is configured to point out a predetermined direction fixed in relation to the orientation of the drone 160 in the air 210. As the human operator 120 is aware of the predetermined direction, it is easy to for the human operator 120 to understand the way the steering commands given with the remote controller 150 influence the flying. As shown in FIG. 3, the remote controller 150 may include two joysticks 310, 312, for example, to give the steering commands. Naturally, also other kinds of steering arrangements are compatible with the described embodiments. However, the remote controller 150 may control the drone 160 in various degrees of freedom: a roll, which tilts the drone 160 left or right, a pitch, which tilts the drone 160 forward or backward, and a yaw, which rotates the drone 160 clockwise or counterclockwise. Furthermore, an altitude control controls the drone 160 to fly higher or lower. Note that some user interface elements of the remote controller 150 may be programmed to interact with the apparatus 100 so that user interface operations of the apparatus 100, besides being performed in the augmented reality environment, may also be performed with (physical) user interface elements of the remote controller 150.

Figure 4:
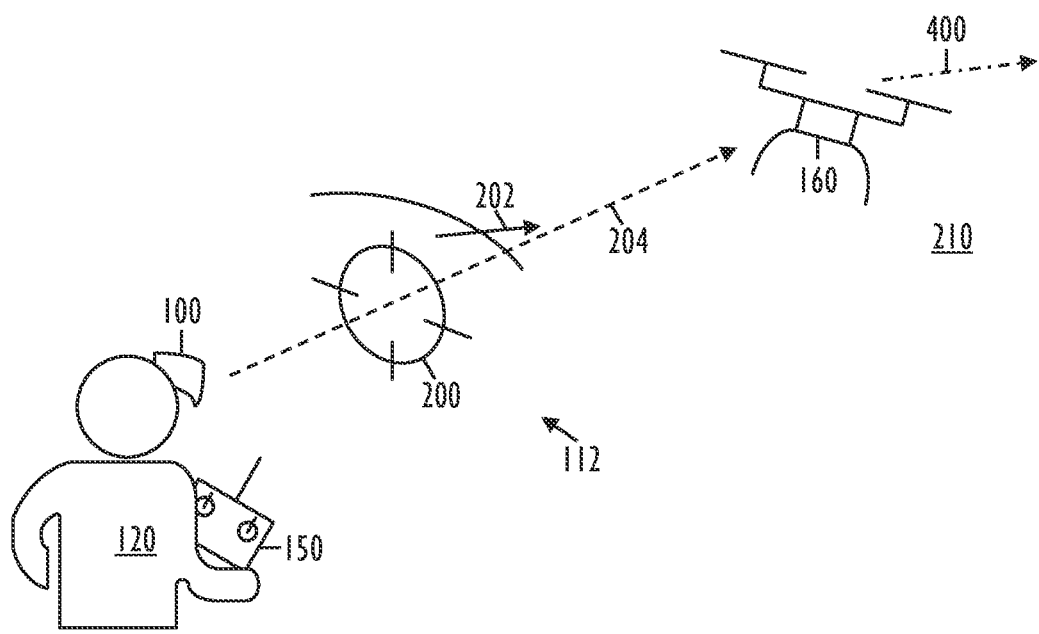

In an embodiment illustrated in FIG. 4, the predetermined direction is fixed in relation to a heading 400 of the drone 160. In navigation, the heading 400 of the drone 160 is a compass direction in which a nose of the drone 160 is pointed. Note that the drone 160, being a quadcopter (=a helicopter with four rotors), for example, may not have a "natural" nose, in which case one direction of the drone 160 is just defined as the nose.

Figure 5:
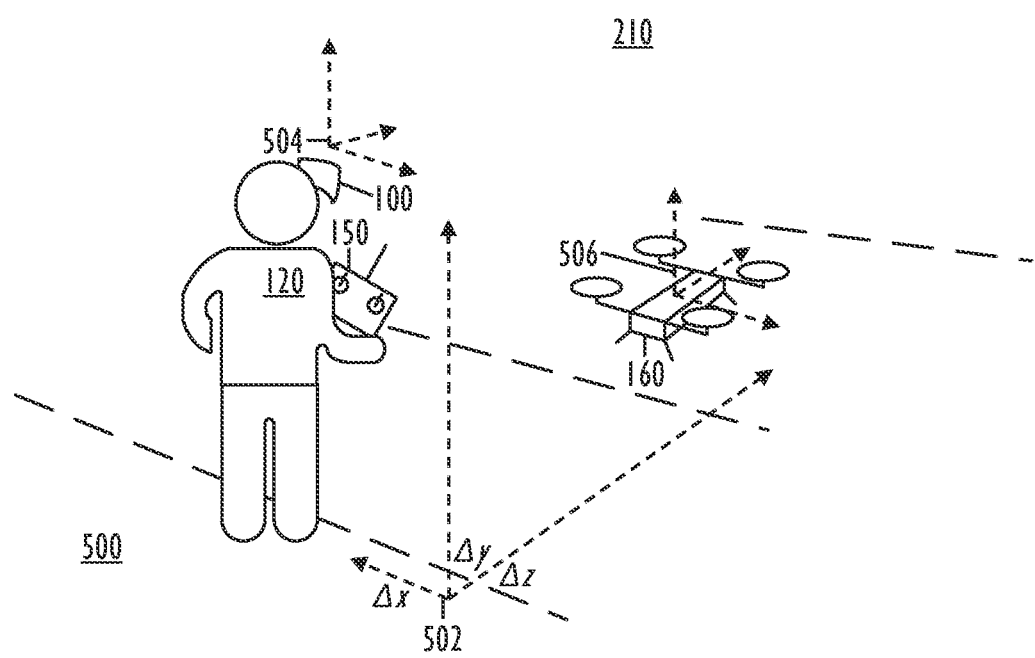

FIG. 5 illustrates the various coordinate systems 502, 504, 506 that need to be related to each other in order to enable the embodiments. A world coordinate system 502 defines a three-dimensional world model visualization, which is mapped to a coordinate system 504 of the apparatus 100 and to a coordinate system 506 of the drone 160. The apparatus 100 then shows the augmented reality using its own coordinate system 504 but also illustrating the position of the drone 160 and the position of the human operator 120 in the world coordinate system 502.

Figure 6:
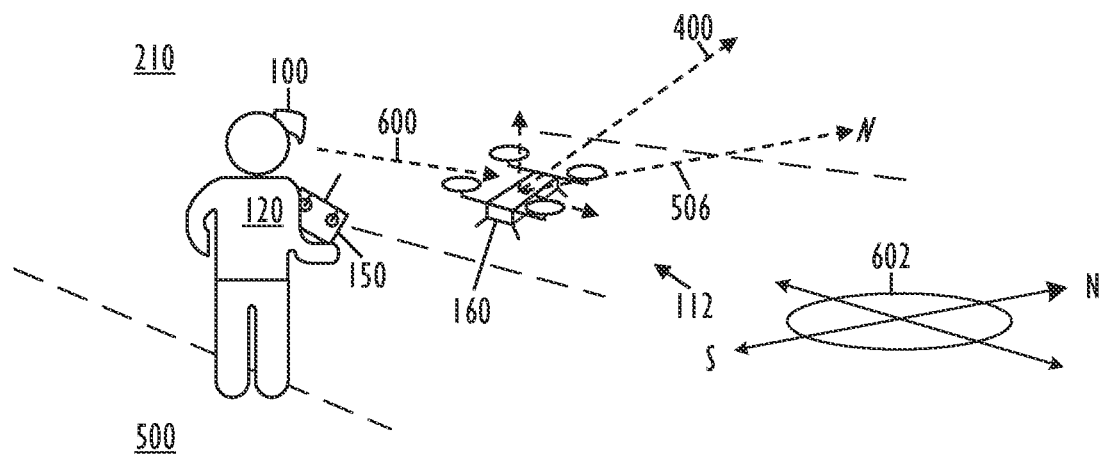

In an embodiment illustrated in FIG. 5 and FIG. 6, the apparatus 100 is caused to perform:
 obtaining a position of the drone 160 on the ground 500 in the world coordinate system 502;
 obtaining a position of the drone 160 on the ground 500 in the augmented reality coordinate system 504 of the apparatus 100;
 locking the position of the drone 160 in the augmented reality coordinate system 504 with the position of the drone 160 in the world coordinate system 502;
 obtaining the heading 400 of the drone 160 on the ground 500; and
 setting the heading 400 as an orientation of a calibration heading symbol in the augmented reality coordinate system 504 of the apparatus 100.

In this way, the augmented reality coordinate system 504 that constantly tracks any movement of the head of the human operator 120, is now firmly based in the world coordinates 502, and also follows the actual compass directions 602. The coupling of world latitude and longitude (x and z of the world coordinate system 502) and the compass heading information 602 into the augmented reality presentation is thus achieved.

In a more specific embodiment, the apparatus 100 is caused to perform:
 obtaining (from the remote controller 150 or from the drone 160), the position of the drone 160 on the ground 500 in the world coordinate system 502;
 superimposing, on the augmented reality display 112, a calibration position symbol;
 receiving a first user acknowledgment after the calibration position symbol is placed on the drone 160 (such as on a centre of the drone 160 or on another predetermined point on the drone 160);
 obtaining (from the augmented reality engine 144), the position of the drone 160 on the ground 500 in the augmented reality coordinate system 504 of the apparatus 100;
 locking the position of the drone 160 in the augmented reality coordinate system 504 with the position of the drone 160 in the world coordinate system 502;
 obtaining (from the remote controller 150 or from the drone 160), the heading 400 of the drone 160 on the ground 500;
 superimposing, on the augmented reality display 112, a calibration orientation symbol;
 receiving a second user acknowledgment after the calibration orientation symbol is aligned with the drone 160 (such as with a tail-nose line of the drone 160 or with another predetermined orientation of the drone 160); and
 setting the heading 400 as the orientation of the calibration orientation symbol in the augmented reality coordinate system 504 of the apparatus 100.

At first, the augmented reality system is shown the position of the drone 160 in the world coordinate system 502, and the position of the drone 160 in relation to the augmented reality coordinate system 504. By indicating that the drone 160 centre is situated in this exact spot within the augmented reality field of view 112, with augmented reality indicators, that spot is now known both in the real world coordinate system 502 and in the augmented reality system coordinates 504. With this combination, a fixed common position with the world latitude and longitude information is obtained. This latitude and longitude comes from the 160 drone, as it knows at this moment its exact coordinates (provided by GPS or another global navigation satellite system, or by another positioning technology such as a cellular radio-based positioning). An augmented reality pointer stick, or another type of the calibration position symbol may indicate a position in the augmented reality display 112 for the human operator 120. When showing the drone 160 location, this stick, which moves at a fixed distance in front of the human operator 160 and points down, is guided to be on top of the centre of the drone 160. It is held steady to confirm the position, which then locks the coordinate systems 502, 504 together. Alternatively, this may also be done using a machine vision, just seeing the drone 160 and deciphering its place in the augmented reality coordinate system 504, then locking the drone 160 latitude, longitude and even heading into that shape. Showing the position of the drone 160 may be done in many ways, but it needs to be done with confidence to lock the world and augmented reality coordinate systems 502, 504 reliably together.

Secondly, as the drone 160 knows where its nose is pointed at, i.e., the drone 160 tells its compass heading in degrees, this may be used to finalize the coupling of the coordinate systems 502, 504. The augmented reality system is used to align a displayed line or another type of the calibration orientation symbol with a tail-nose-line of the drone 160, and when this is achieved, this compass orientation of the displayed line in the world coordinate system 502 is now known. Thus, the world compass heading of any direction, for example North may be calculated from it.

As an optional step, at the time when the world position (latitude, longitude) is obtained from the drone 160, an exact altitude (y in the world coordinate system 502) may also be queried from a map system based on the exact world coordinates 502, or from the drone 160 itself, possibly via the remote controller 150. So, we may also calibrate an altitude for this point in space (with a drone-specific offset of the top surface of the drone 160 from the ground 500, if an exact precision is needed), and so use the map data to accurately determine any other world point terrain altitude from here on. To summarize, the latitude, the longitude, possibly the altitude, and the compass heading may be needed for the world locking to be achieved.

After this coupling, everything else in the whole system is built around the knowledge of where the drone 160 actually is in the world coordinates 502 and what is around it exactly there in the world. Note that the described embodiments related to the coupling may operate as stand-alone embodiments, irrespective of all other embodiments, also those described in relation to the independent claims and other dependent claims.

The data related to the flying is mapped to the world coordinates 502, and is consequently displayed 3004, 3006, 3008 so that its visualization takes advantage of knowing its three-dimensional position expressed in the world coordinate system 502, which is locked to the augmented reality coordinate system 504.

Figure 7:
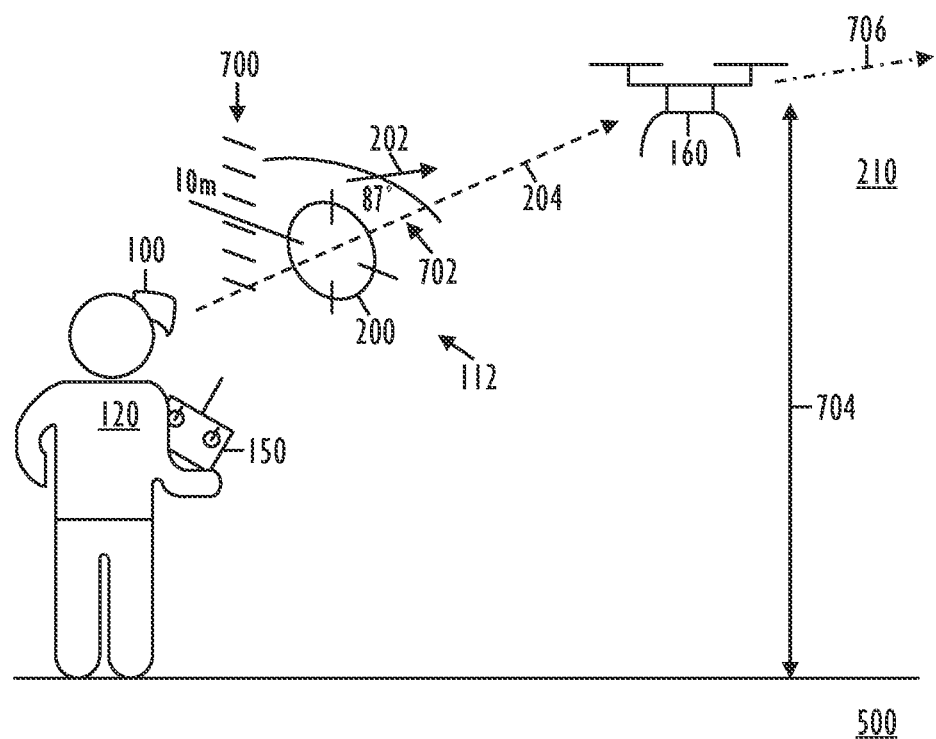

In an embodiment, illustrated in FIG. 7, the situational awareness may further be enhanced with numerical information. The apparatus 100 is caused to superimpose, on the augmented reality display 112, a cruising altitude 704 of the drone 160 using a numerical value and a scale 700 visually coupled with the target symbol 200 while the human operator 120 is looking 204 towards the drone 160 in the air 210. As shown in FIG. 7, the scale 700 may include horizontal lines each indicating a specific altitude. The apparatus is also caused to superimpose, on the augmented reality display 112, a heading 706 of the drone 160 in degrees 702 visually coupled with the orientation symbol 202 while the human operator 120 is looking 204 towards the drone 160 in the air 210. This may be useful for an expert human operator 120.

Figure 8:
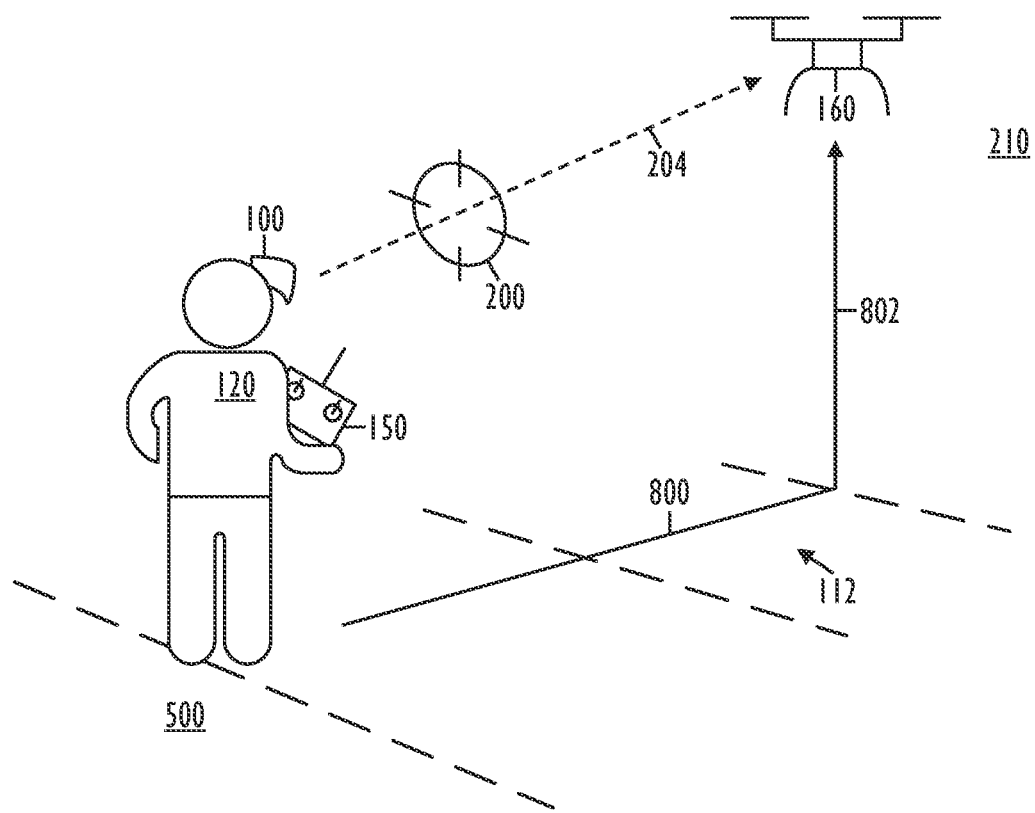

In an embodiment illustrated in FIG. 8, the apparatus 100 is caused to superimpose, on the augmented reality display 112, an indirect line of sight guideline 800 extending horizontally to the geographic location of the drone 160 on the ground 500, from which the indirect line of sight guideline 802 continues to extend vertically to the target symbol 200 in a cruising altitude of the drone 160 in the air 210 while the human operator 120 is looking 204 towards the drone 160 in the air 210. This may further enhance the situational awareness, as the human operator 120 may first observe the horizontal guideline 800 to see the geographic location of the drone 160 on the earth surface 500, and then observe the vertical guideline 802 to grasp where the drone 160 is in the air 210.

Figure 9:
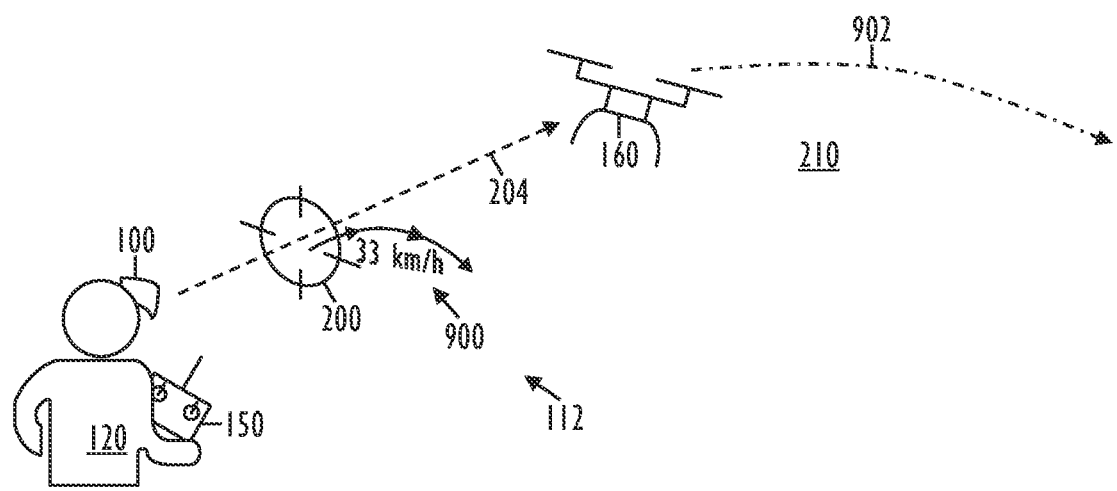

In an embodiment illustrated in FIG. 9, the apparatus 100 is caused to superimpose, on the augmented reality display 112, a track symbol 900 indicating a track 902 and a speed of the drone 160 in the air 210 while the human operator 120 is looking 204 towards the drone 160 in the air 210. In navigation, the track 902 is a route that the drone 160 actually travels. A difference between the heading 400 and the track 902 is caused by a motion of the air 210 (such as by an air current). By showing the track 902 and the speed, the human operator 120 foresees an effect of the current control, which may then be adjusted as necessary.

Figure 10:
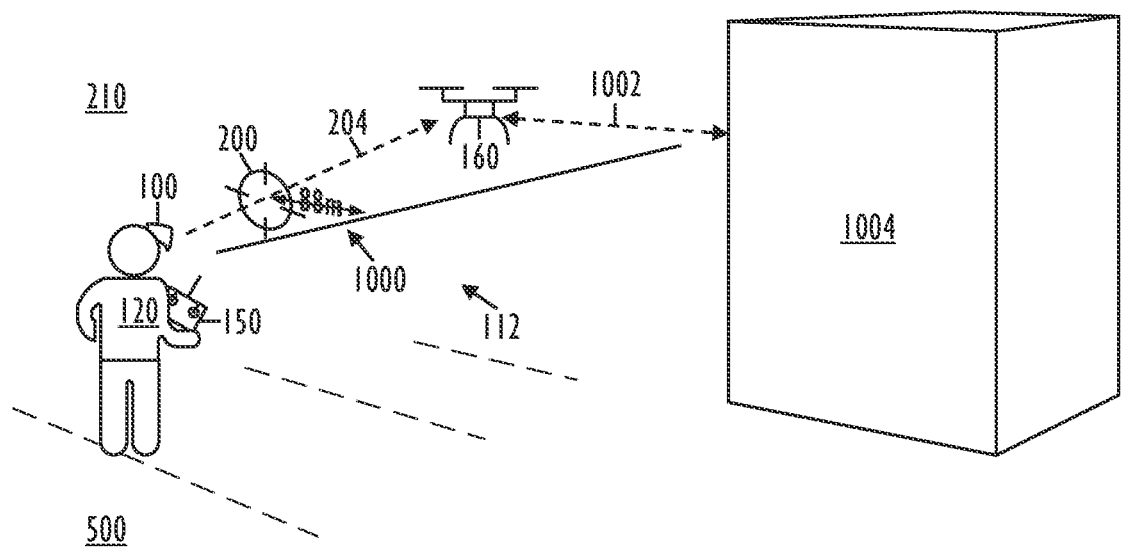
Figure 11:
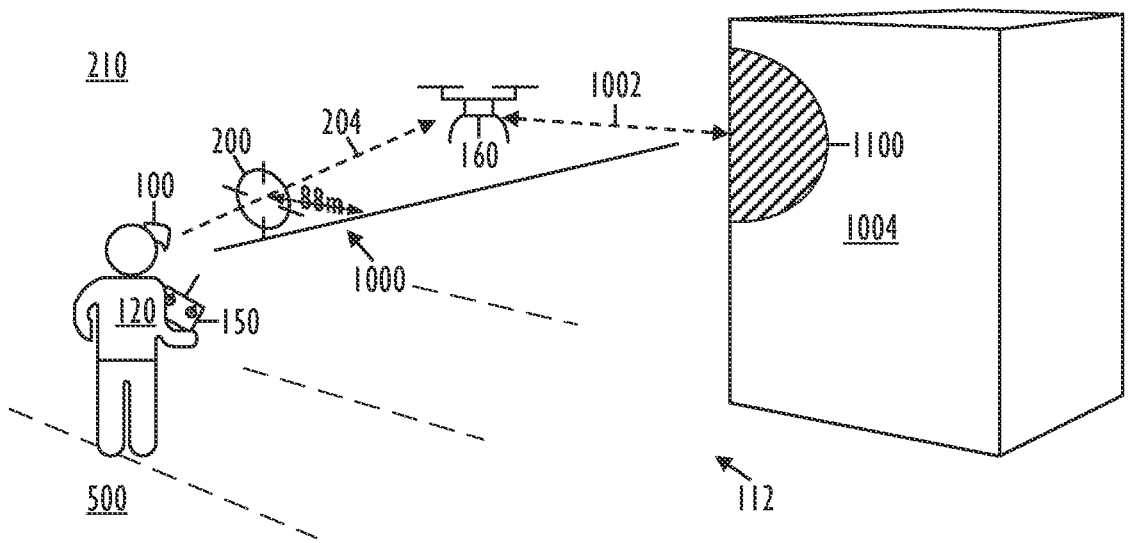
Figure 12:
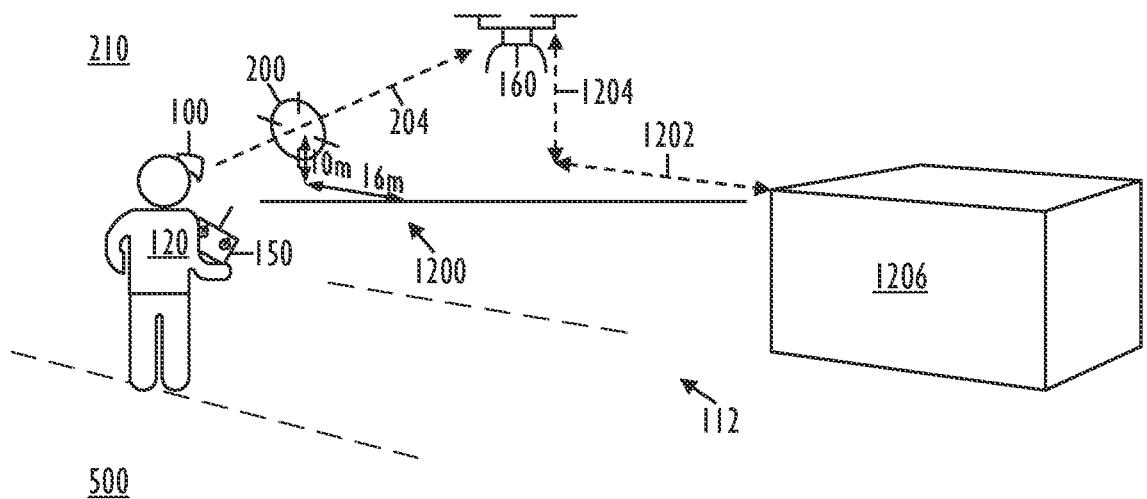

Let us next study FIG. 10, FIG. 11, and FIG. 12, which illustrate embodiments of visualizing an obstacle in relation to the drone 160.

In an embodiment illustrated in FIG. 10, the apparatus 100 is caused to superimpose, on the augmented reality display 112, an obstruction indicator symbol 1000 configured to depict a distance 1002 of the drone 160 to a real object 1004 while the human operator 120 is looking 204 towards the drone 160 in the air 210. The distance 1002 may be the shortest distance between the drone 160 and the real object 1004. As shown in FIG. 10, the obstruction indicator symbol 1000 may mark the distance using an arrow, possibly augmented by a numerical value indicating the distance 1002. The real object 1004 may be a man-made object such as a building, a bridge, etc., or a natural object such as a hill, a forest, etc.

FIG. 11 illustrates an additional embodiment, wherein the obstruction indicator symbol 1000 comprises a visual indicator 1100 superimposed at least partly over the real object 1004. As shown in FIG. 11, the visual indicator 1100 may be a shading or a similar visual effect overlaid on the real object 1004. In this way, the human operator 120 immediately recognizes a collision danger as the drone 160 approaches the object 1004.

FIG. 12 illustrates a further embodiment, applicable to either the embodiment of FIG. 10 or the embodiment of FIG. 11. The obstruction indicator symbol 1200 comprises elements depicting a shortest horizontal 1202 and vertical 1204 distance from the drone 160 to the real object 1206. In this way, an effect of both vertical and horizontal movement of the drone 160 may be recognized in order to avoid a collision with the real object 1206.

Figure 13:
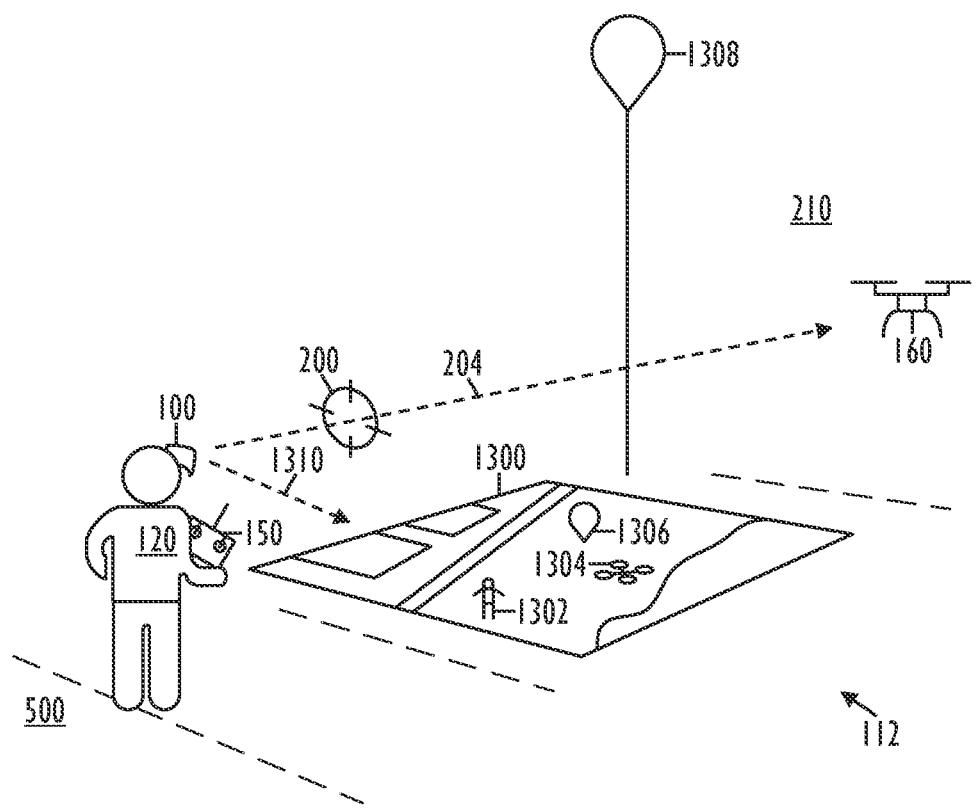
FIG. 13 illustrates embodiments of visualizing a waypoint in relation to the drone.

Let us next study FIG. 13, which illustrates embodiments of visualizing a waypoint in relation to the drone 160. The apparatus 100 is caused to superimpose, on the augmented reality display 112, a map 1300 showing a geographic location 1302 of the human operator 120, a geographic location 1304 of the drone 160, and a waypoint 1306. In this way, the human operator 120 intuitively has a better understanding of the surroundings related to the flying. As shown in FIG. 13, the map 1300 and the drone 160 may be simultaneously within the field of vision of the human operator 120, and the gaze may alternate as being directed 204 to the drone or being directed 1310 to the map 1300. The apparatus 100 is also caused to superimpose, on the augmented reality display 112 a vertical waypoint symbol 1308 starting from a geographic location of the waypoint 1306 on the ground 500 and extending towards a predetermined altitude of the waypoint 1306 while the human operator 120 is looking 204 towards the drone 160 in the air 210. A narrow part of the waypoint symbol 1308 may accurately pinpoint the geographic location on the earth 500, whereas a broader part of the waypoint symbol 1308 may indicate the set altitude of the waypoint in the air 210. In this way, the waypoint symbol 1308 is shown in the correct location of the real world.

Figure 14:
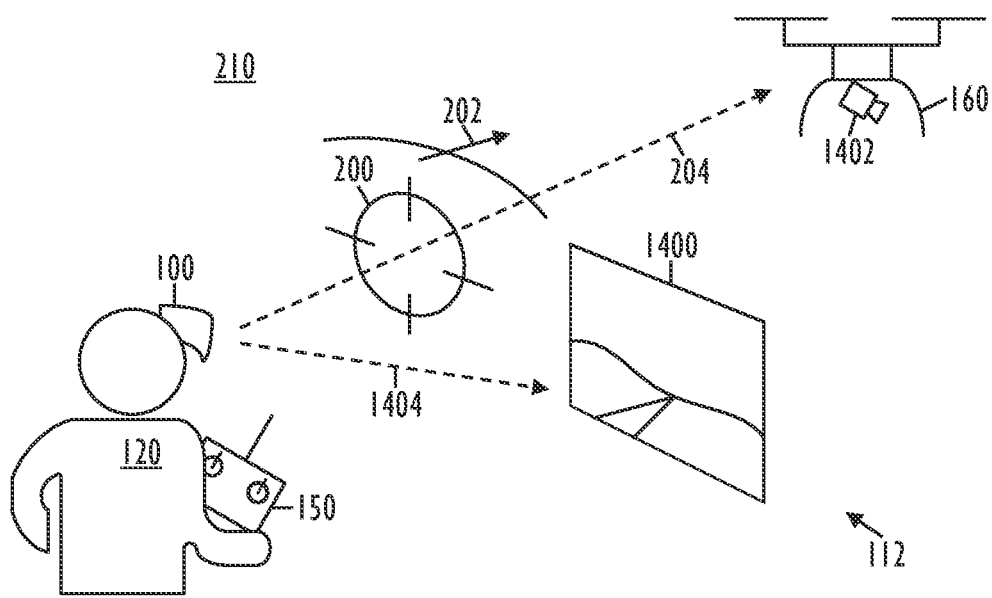
FIG. 14 and FIG. 15 illustrate embodiments of visualizing data captured by the drone.
Figure 15:
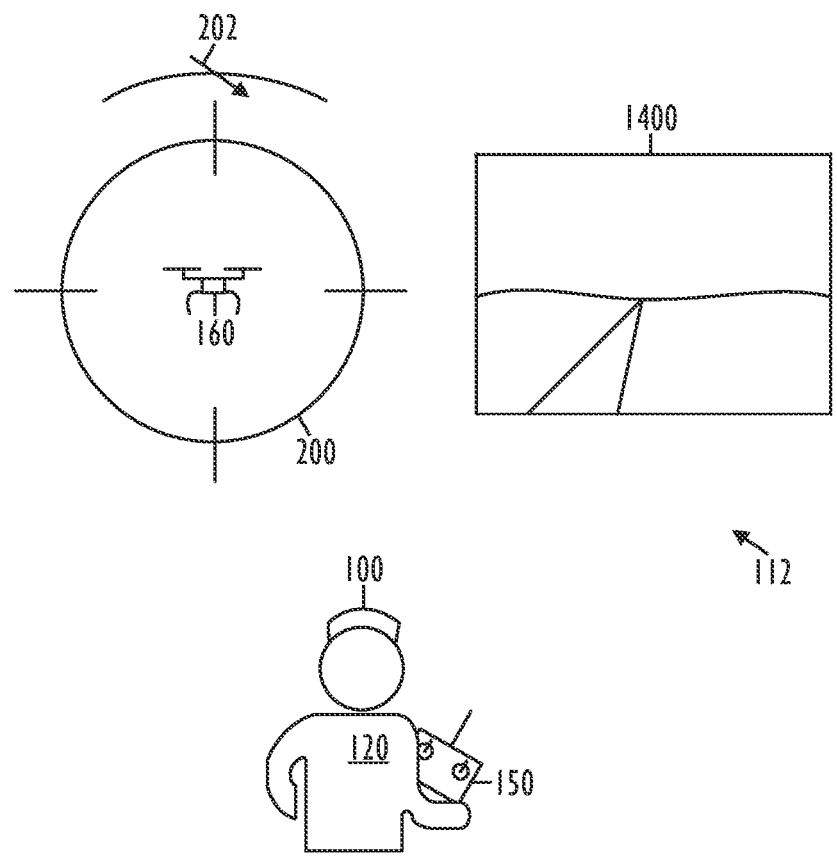

Next, FIG. 14 and FIG. 15 illustrate embodiments of visualizing data captured by the drone 160. The apparatus 100 is caused to superimpose, on the augmented reality display 112, one or more visual elements 1400 captured in real-time using one or more sensors 1402 onboard the drone 160 in the vicinity of the target symbol 200 while the human operator 120 is looking 204 towards the drone 160 in the air 210, and position, on the augmented reality display 112, the one or more visual elements 1400 so that a line of sight remains unobstructed while the human operator 120 is looking 204 towards the drone 160 in the air 210. The visual element(s) 1400 may be placed on either side of the target symbol 200 as shown, but also anywhere around the target symbol 200. In any case, the human operator 120 may quickly glance 1404 the visual element(s) 1400, but mainly look 204 towards the drone 160 and simultaneously steer the drone 170. In the illustrated embodiment, an image sensor 1402 captures images or a video feed as the data, which is then superimposed as the visual element 1400 on the augmented reality display 112. In this way, the human operator 120 may steer the drone 120 so that the image sensor 1402 shoots the desired view. Note that the image sensor may operate as a (normal) visible light camera such as a photographic camera or a video camera. Besides this, the image sensor may operate as a thermal (or infrared) camera, a multispectral camera, a hyperspectral camera, or a corona discharge camera, for example. The one or more sensors 1402 onboard the drone 160 may comprise, but are not limited to one or more of the following technologies: a lidar (light detection and ranging, or laser imaging, detection, and ranging, or 3-D laser scanning) sensor, a sonar (sound navigation and ranging) sensor, a radar (radio detection and ranging) sensor, a chemical sensor, a biological sensor, a radiation sensor, a particle sensor, a magnetic sensor, a network signal strength sensor, etc. The drone 160 may carry any combination of these sensors 1402 as the payload, whose data is then visualized as explained with the dynamically positioned one or more visual elements 1400.

Figure 16:
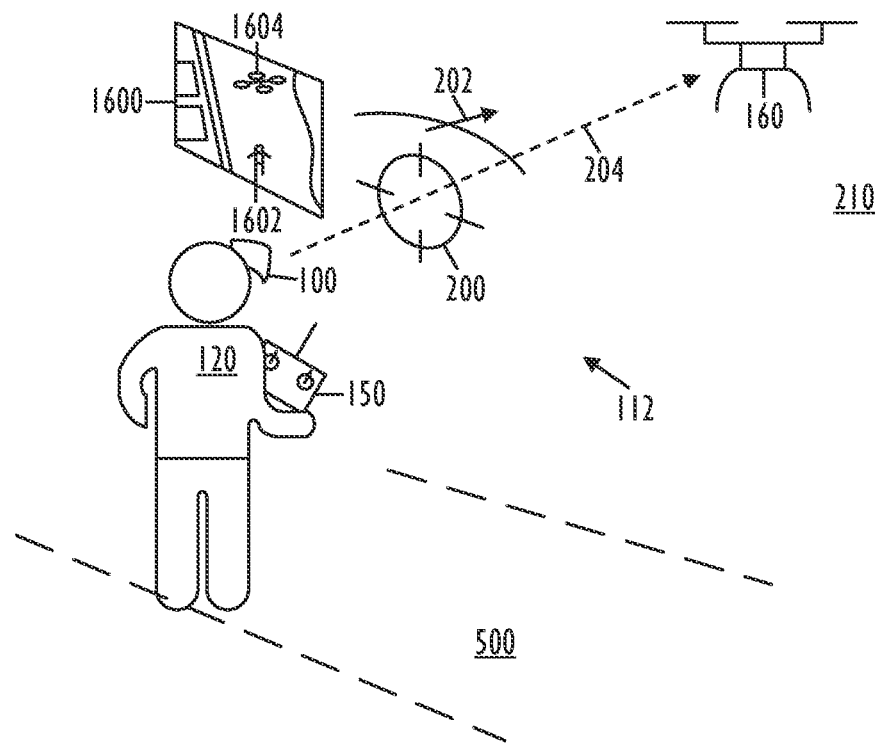
FIG. 16 and FIG. 17 illustrate embodiments of visualizing maps related to the flying of the drone.
Figure 17:
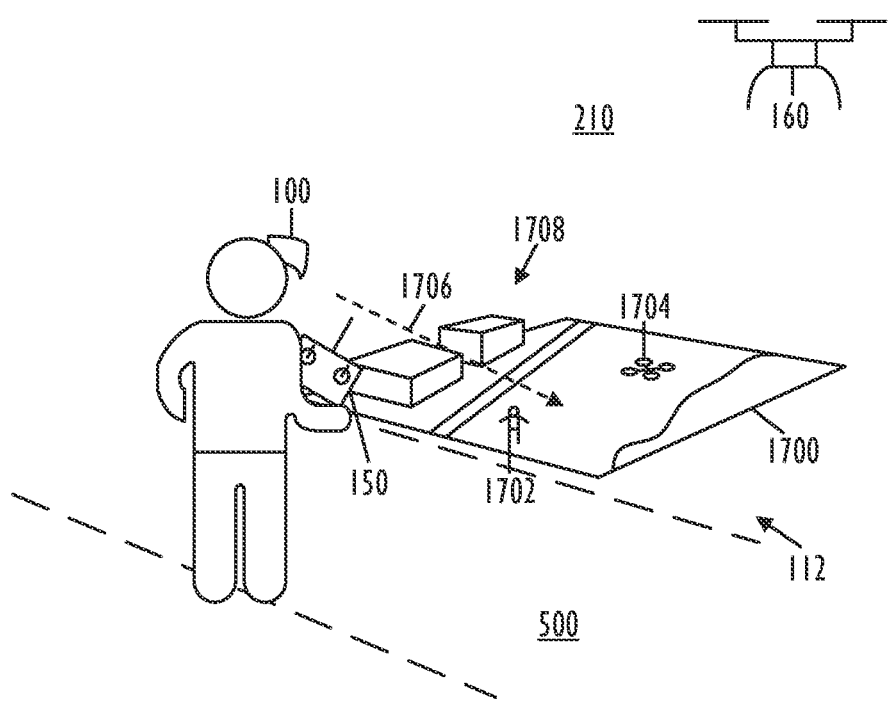

FIG. 16 and FIG. 17 illustrate embodiments of visualizing maps related to the flying of the drone 160. The human operator 120 may choose the layout of the map 1600, 1700, or the apparatus 100 may automatically decide which layout to use depending on the flying situation. The apparatus 100 is caused to superimpose, on the augmented reality display 112, a map 1600 in a vertical layout showing a geographic location 1602 of the human operator 120 and a geographic location 1604 of the drone 160 in the vicinity of the target symbol 200 on the augmented reality display 112 while the human operator 120 is looking 204 towards the drone 160 in the air 210. Alternatively, the apparatus 100 is caused to superimpose, on the augmented reality display 112, a map 1700 in a horizontal layout showing a geographic location 1702 of the human operator 112 and a geographic location 1704 of the drone 160 while the human operator 120 is looking 1706 towards the ground 500. By using the vertical layout map 1600, the situational awareness may be retained at all times as the human operator gazes 204 towards the drone 160 and sees the map 1600 at the side. By using the horizontal layout map 1700, the human operator 120 needs to look 1706 towards the ground 500, but as shown the map 1700 may be shown larger and more intuitively as the map 1700 surface is parallel with the earth surface 500.

FIG. 17 also illustrates that the used maps 1700 may be three-dimensional topographic maps illustrating also the altitude data as depicted by the three-dimensional buildings 1708.

Figure 18:
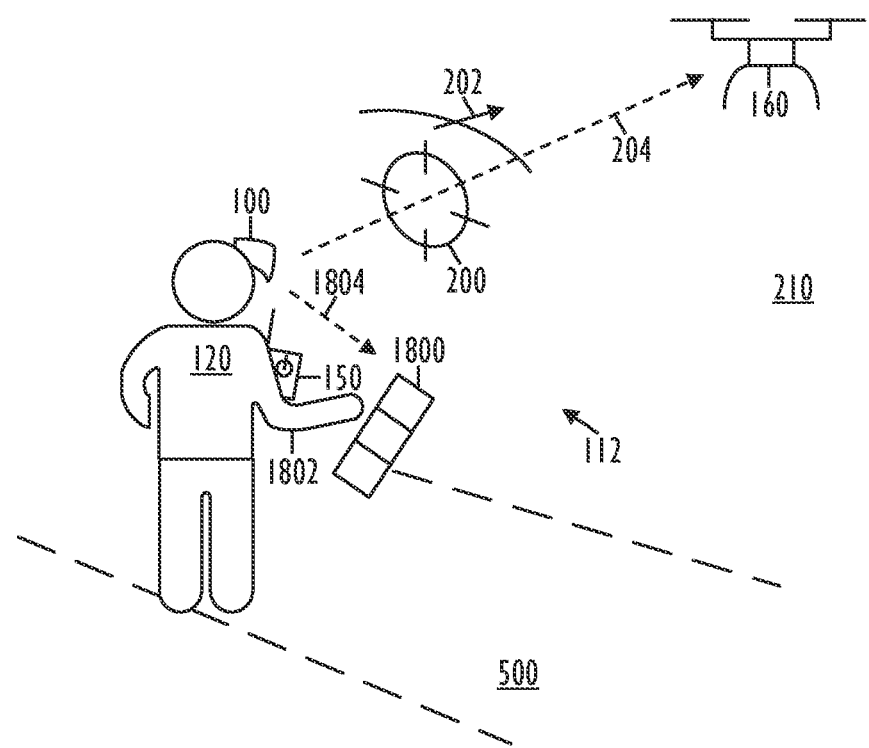
FIG. 18 and FIG. 19 illustrate embodiments of visualizing menu structures of the apparatus.
Figure 19:
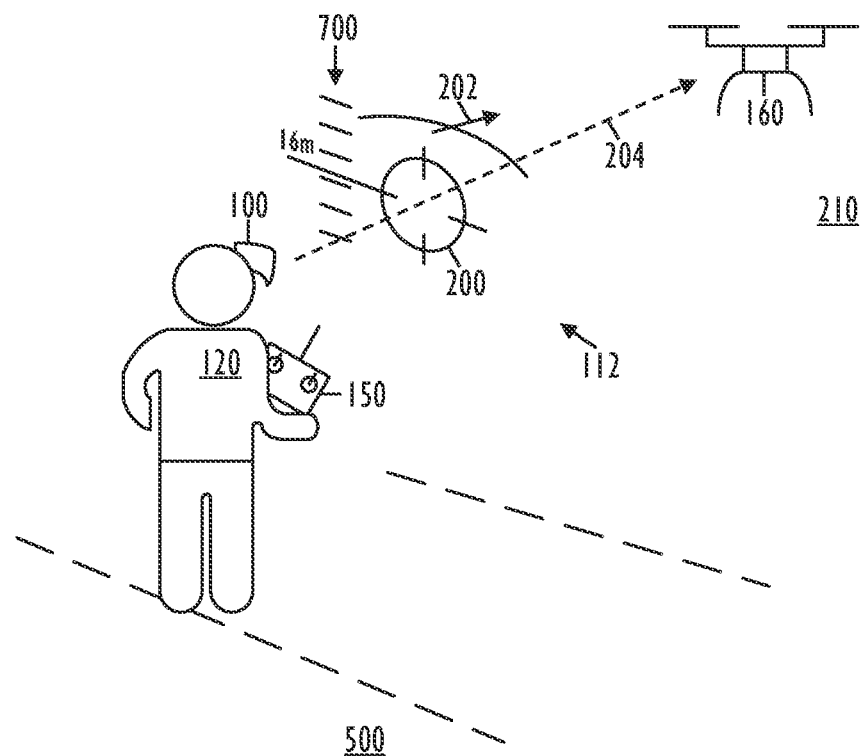

FIG. 18 and FIG. 19 illustrate embodiments of visualizing menu structures of the apparatus 100. The apparatus 100 is caused to superimpose, on the augmented reality display 112, a menu structure 1800 around the human operator 120 while the human operator 120 is looking 1804 towards the ground 500. The apparatus 100 is caused to detect a gesture 1802 from the human operator 120 as a command related to the menu structure 1800, and control, on the augmented reality display 112, the display 1900 of the data related to the flying based on the command. In this way, the human operator 120 may quickly manipulate the apparatus 100. As shown, in FIG. 18, the basic display of the target symbol 200 and the orientation symbol 202 are shown, whereas in FIG. 19, the human operator 120 has chosen from the menu structure 1800 to display the cruising altitude of the drone 160 using the numerical value and the scale 700 visually coupled with the target symbol 200 as explained earlier with reference to FIG. 7.

FIG. 20, FIG. 21, and FIG. 22 illustrate embodiments of visualizing external data related to a physical environment of the drone 160.

As shown in FIG. 1A and FIG. 1B, the apparatus 100 comprises an external data communication interface 110 configured to receive external data 114 related to a physical environment of the drone 160. Note that the external data communication interface 110 may in an embodiment be implemented using the internal data communication interface 108. The apparatus 100 is caused to superimpose, on the augmented reality display 112, one or more visualizations 2000 of the external data 114. In this way, the apparatus 100 may increase the situational awareness of the human operator 120 by incorporating external data sources to the single user interface implemented by the augmented reality display 112. As explained earlier, the external data 114 is mapped to the world coordinates 502, and is consequently displayed so that its visualization takes advantage of knowing its three-dimensional position expressed in the world coordinate system 502, which is locked to the augmented reality coordinate system 504. Besides obtaining external data from various sources, the external data communication interface 110 may also be used to communicate data related to the flying to outside receivers 116, the data being transmitted including, but not being limited to: the position of the drone 160, speech from the human operator 120, one or more video feeds from the drone 160, etc.

As shown in FIG. 20, the external data 114 may comprise weather data, and the one or more visualizations 2000 depict the weather data. In an embodiment, the weather data includes information on a speed and a direction of the wind. The direction may be indicated by arrows, and the speed may be indicated by a scale of the arrows as shown or alternatively by a numerical value. Additionally, or alternatively, the weather data may include one or more of the following: turbulences (predicted or known), humidity, cloud visualizations, rain warnings, hail warnings, snow warnings, storm warnings, warnings about lightning, lighting conditions (time of day, position of sun and/or moon), fog, air temperature and pressure, visibility, dew point (important for aviation pilots), "feels like" temperature. And all this may also be tied to time, i.e., the weather predictions may be visualized, for example incoming cloud fronts and wind changes.

As shown in FIG. 21, the external data may comprise 114 air traffic control data including classifications of airspaces, and the one or more visualizations 2100, 2102 depict the classification of the airspace matching the position of the drone 160 in the air 210. As shown, a free airspace 2100 may be marked with "I", and a restricted airspace 2102 may be marked with "II" and a shaded rectangle as shown or with another three-dimensional shape (such as a polygon mesh) or even with a two-dimensional shape (such as a polygon). In general, the classifications of airspace may include, but are not limited to: drone no fly zones (areas, volumes), reservations and notifications of airspaces for drone and/or other aviation operations, airfield control zones, airspace control zones, power lines and other obstacles, country border zones, all of the aforementioned in different altitudes, warning/danger/restricted zones, UAV reserved areas, UAS reserved areas, model airplane reserved areas. An aviation map may be visualized using a three-dimensional polygon mesh with various walls, roofs, flight levels, etc, all of which are in their correct places as seen in the augmented reality display 112.

As shown in FIG. 22, the external data may comprise 114 air traffic control data including positions of aircraft 2200 in the air 210, and the one or more visualizations 2202, 2204 depict the positions of the aircraft 2200 in the air 210. In an embodiment, the one or more visualizations 2202, 2204 are shown for the aircraft 2200 flying within a predetermined distance (such as within a radius of 3, 5 or 10 kilometres, for example) from the position of the drone 160 in the air 210. The visualizations may be implemented with arrows 2202, 2204 indicating the location of the aircraft 2200, and additionally or alternatively a simulation of the aircraft 2200 may be shown.

FIG. 23, FIG. 24, FIG. 25, FIG. 26, and FIG. 27 illustrate embodiments of visualizing a line of sight to the drone 160 during different visibilities.

Figure 23:
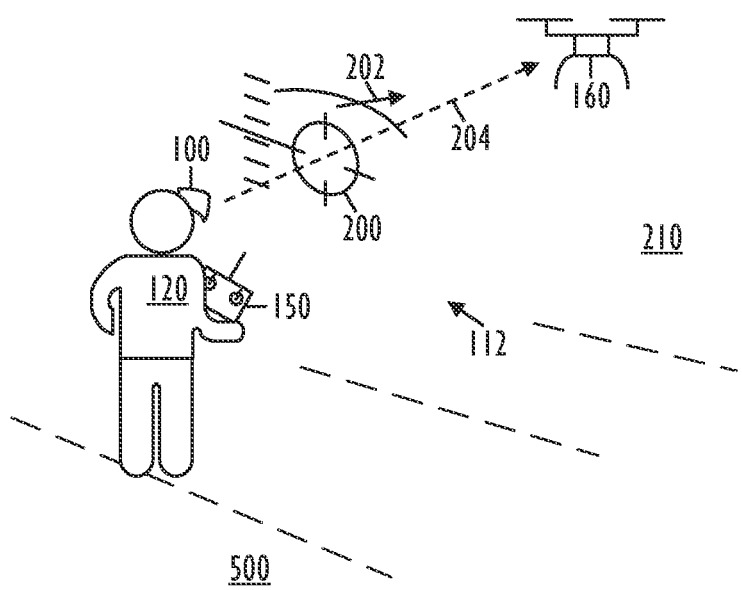

In an embodiment of FIG. 23, the apparatus 100 is caused to superimpose, on the augmented reality display 112, the data related to the flying while the human operator 120 is looking 204 towards the drone 160 in the air 210 with a visual line of sight to the drone 160 during a good visibility. This is the ideal flying situation.

Figure 24:
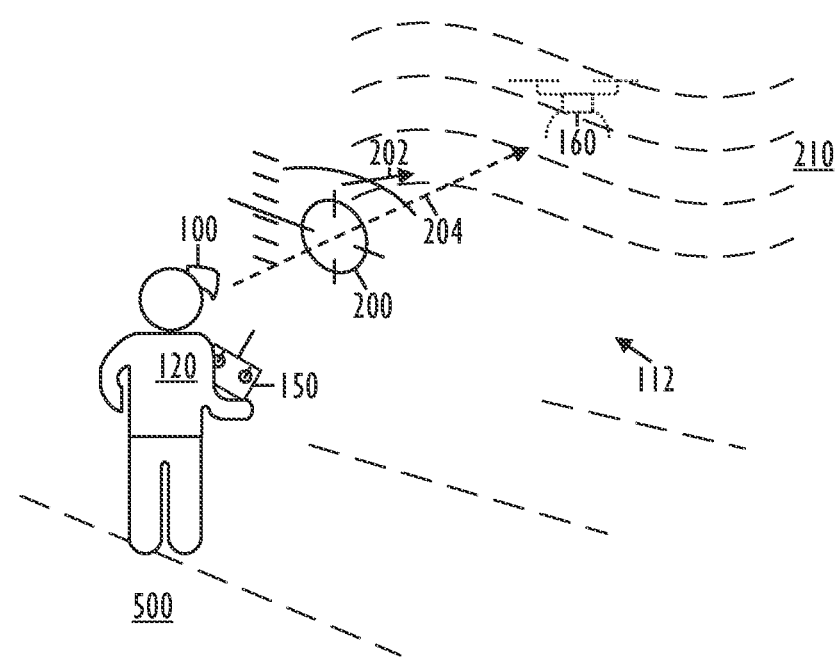

In an embodiment of FIG. 24, the apparatus 100 is caused to superimpose, on the augmented reality display 112, the data related to the flying while the human operator 120 is looking 204 towards the drone 160 in the air 210 with an augmented line of sight to the drone 160 during an impaired visibility. The augmented line of sight may be achieved by guiding the human operator 120 to look at the right direction with the target symbol 200. Optionally, a simulated drone 160 may be shown in the correct position. The impaired visibility may be caused by a low-light condition, cloud, fog, smog, rain, snowfall, or some other physical phenomenon.

Figure 25:
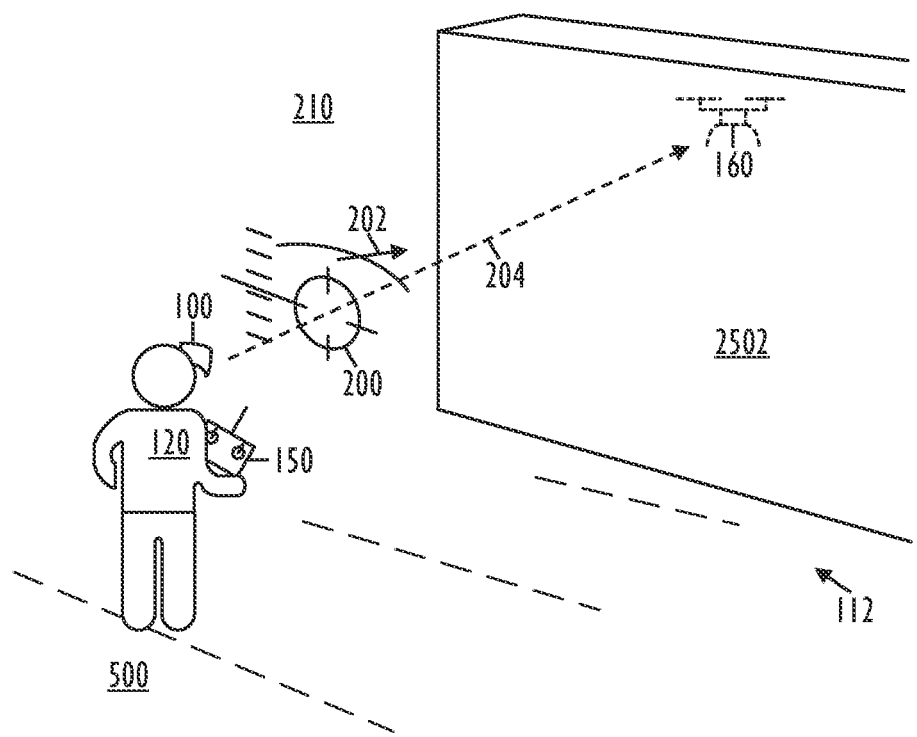

In an embodiment of FIG. 25, the apparatus 100 is caused to superimpose, on the augmented reality display 112, the data related to the flying while the human operator 120 is looking 204 towards the drone 160 in the air 210 with an augmented and simulated line of sight to the drone 160 during an obstructed visibility. The obstructed visibility may be caused by an obstacle 2502, i.e., the drone 160 is behind the obstacle 2502. The obstacle 2502 may be the real object 1004 of FIG. 10 and FIG. 11, i.e., the obstacle 2502 may be a man-made object such as a building, a bridge, etc., or a natural object such as a hill, a forest, etc. The augmentation is achieved by guiding the human operator 120 to look at the right direction with the target symbol 200, and the simulation by showing a simulated drone 160 in the correct position.

In an embodiment, the apparatus 100 is caused to superimpose, on the augmented reality display 112, the data related to the flying while the human operator 120 is looking 204 towards the drone 160 in the air 210 with an augmented line of sight to the drone 160 during a long-distance visibility. This is not shown in any drawing, but basically the drone 160 is then high up in the sky, or near the horizon, for example, and the human operator 120 is guided to look at the right direction with the target symbol 200, whereby the human operator 120 may only see the drone 160 as a tiny object in the distance.

Figure 26:
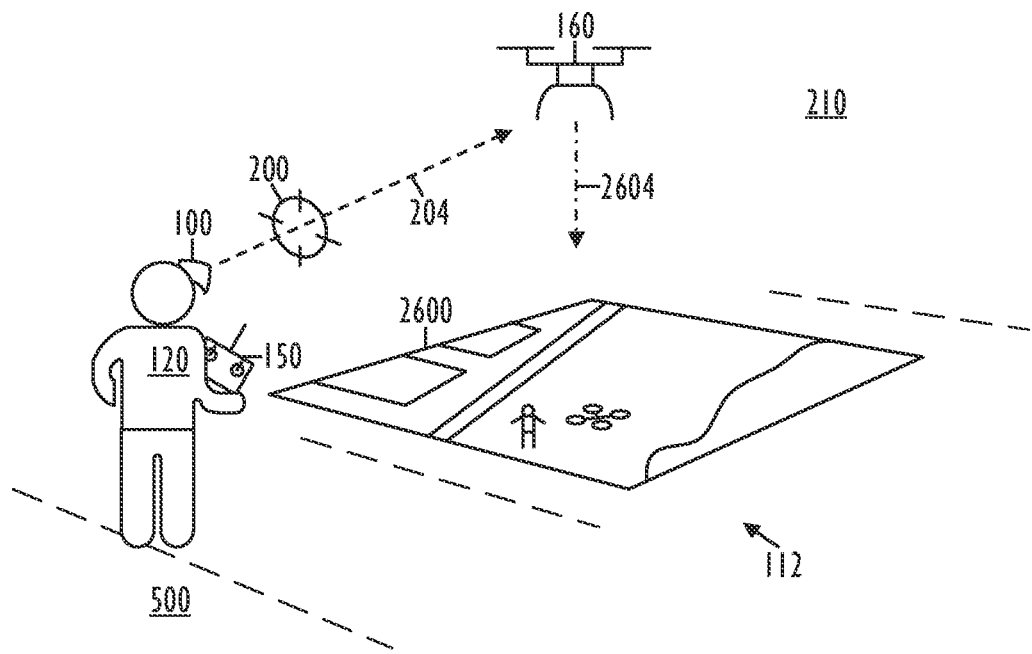
Figure 27:
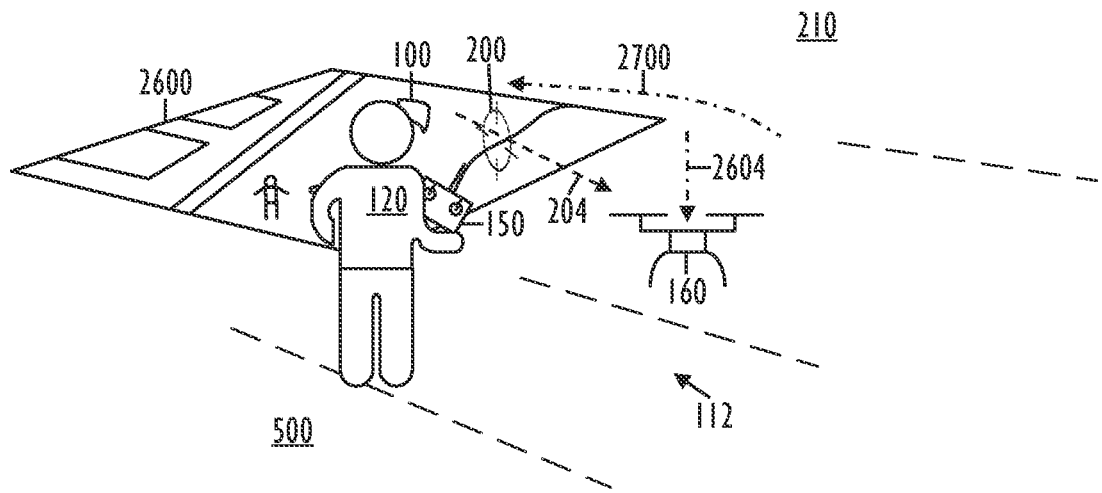

In an embodiment illustrated in FIG. 26 and FIG. 27, the apparatus 100 is caused to adjust 2700, on the augmented reality display 112, the display 2600 of the data related to the flying so that a line of sight 2602 remains unobstructed while the human operator 120 is looking 204 towards the drone 160 in the air 210. In FIG. 26, the human operator 120 keeps on looking 204 towards the drone 160 with a free line of sight 2602. However, as the drone is descending 2604, the map 2600 would eventually obstruct the line of sight 2602. As shown in FIG. 27, the drone 160 is now flying relatively low, but the line of sight 2602 remains free due to the moving 2700 of the map 2600 to the left.

Let us finally study FIG. 28 and FIG. 29, which illustrate embodiments of a system comprising two apparatuses 100, 2800.

A first apparatus 100 is used for assisting a first human operator 120 in flying the drone 160 in the air using 210 the remote controller 150.

A first geographic location 2814 of the first human operator 120 in relation to the position of the drone 160 in the air 210 is used to adjust a first viewpoint for rendering the data related to the flying including a first target symbol 200 and a first orientation symbol 202 to be superimposed on a first augmented reality display 112 of the first apparatus 100.

As illustrated in FIG. 28, a second apparatus 2800 is used for informing a second human operator 2802 in relation to flying the drone 160 in the air 210.

A second geographic location 2804 of the second human operator 2802 in relation to the position of the drone 160 in the air 210 is used to adjust a second viewpoint for rendering the data related to the flying including a second target symbol 2806 and a second orientation symbol 2808 to be superimposed on a second augmented reality display 2810 of the second apparatus 2800.

In this way, the second human operator 2802 may at least observe 2812 the flying of the drone 160 in the air 210. This may be useful just for fun, for educational purposes, for passing a test for a flying license, for surveillance, for tracking a missing person, or even for assisting the first human operator 120, for example. One or both operators 120, 2802 may also be provided with the one or more visual elements based on the data captured in real-time using the one or more sensors 1402 onboard the drone 160 as explained earlier.

In an embodiment illustrated in FIG. 29, the second apparatus 2800 is used for assisting the second human operator 2802 in relation to controlling 2902 one or more sensors 1402 onboard the drone 160, while the first human operator 120 controls the flying direction 2908 and speed of the drone 160.

For example, if the sensor 1402 is an image sensor as described earlier, the second geographic location 2804 of the second human operator 2802 is used to adjust the second viewpoint for rendering the data related to the flying including also the one or more video feeds captured in real-time from the one or more video cameras 2900 onboard the drone 160 to be superimposed on the second augmented reality display 2810 of the second apparatus 2800. As shown in FIG. 29, the one or more video feeds 2904 are superimposed on the second augmented reality display 2810.

Note that the use case of FIG. 29 may also be such that both operators 120, 2802 may be shown the same information on the augmented reality displays 112, 2810, and as they both have remote controllers 150, 2906, the responsibility for the flying may be seamlessly transferred on the fly between the operators 120, 2906. This may be especially useful during a training session or during a long mission. It is also envisaged, that in an especially hazardous or restricted airspace, an authorized pilot 2802 may pilot the drone 160 safely across, and thereafter the (original) operator 120 regains the control of the drone 160.

Note that the scenarios of FIG. 28 and FIG. 29 are not limited to the second human operator 2802 being physically present near the drone 160 and the first human operator 120. As was explained earlier, the external data communication interface 110 may communicate data related to the flying to the outside receiver 116. The outside receiver 116 may be a networked computer server, which interoperates with the first apparatus 100 and the second apparatus 2800 according to a client-server architecture, a cloud computing architecture, a peer-to-peer system, or another applicable distributed computing architecture. In this way, the second human operator 120 may be far away, even in a different city, country, or continent, and still able to observe or even assist as described. Naturally, data transmission delays need to be minimized and taken into account, especially if the remote second human operator 2802 is controlling 2902 the one or more sensors 1402, for example.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. An apparatus for assisting an operator in flying operating a drone using a remote controller, comprising:
    an internal data communication interface configured to receive data related to the operation of the drone from the remote controller;
    an augmented reality display configured to display the data related to the operation of the drone to the operator;
    one or more memories including computer program code; and
    one or more processors configured to execute the computer program code to cause the apparatus to perform at least the following:
    tracking a position, orientation, head direction, and gaze direction of the operator;
    superimposing, on the augmented reality display, a target symbol indicating a position of the drone in a real world environment from a perspective of the operator while the operator is looking towards the drone, wherein the target symbol remains fixed to a world coordinate system position of the drone regardless of the position of the operator in such a way that if the operator moves to a new position, the target symbol is visible from a new perspective at the new position; and
    superimposing, on the augmented reality display, an orientation symbol indicating an orientation of the drone from the perspective of the operator while the operator is looking towards the drone.

2. The apparatus of claim 1, wherein the orientation symbol is configured to point out a predetermined direction fixed in relation to the orientation of the drone in air.

3. The apparatus of claim 2, wherein the predetermined direction is fixed in relation to a heading of the drone.

4. The apparatus of claim 1, wherein the apparatus is caused to perform:
    obtaining a position of the drone on the ground in a world coordinate system;
    obtaining a position of the drone on the ground in an augmented reality coordinate system of the apparatus;
    locking a position of the drone in the augmented reality coordinate system with a position of the drone in the world coordinate system;
    obtaining a heading of the drone on the ground; and
    setting the heading as an orientation of a calibration heading symbol in the augmented reality coordinate system of the apparatus.

5. The apparatus of claim 1, wherein the apparatus is caused to perform:
    superimposing, on the augmented reality display, a cruising altitude of the drone using a numerical value and a scale visually coupled with the target symbol while the operator is looking towards the drone in air; and
    superimposing, on the augmented reality display, a heading of the drone in degrees visually coupled with the orientation symbol while the operator is looking towards the drone in the air.

6. The apparatus of claim 1, wherein the apparatus is caused to perform:
    superimposing, on the augmented reality display, an indirect line of sight guideline extending horizontally to a geographic location of the drone on the ground, from which the indirect line of sight guideline continues to extend vertically to the target symbol in a cruising altitude of the drone in air while the operator is looking towards the drone in the air.

7. The apparatus of claim 1, wherein the apparatus is caused to perform:
    superimposing, on the augmented reality display, a track symbol indicating a track and a speed of the drone in air while the operator is looking towards the drone in the air.

8. The apparatus of claim 1, wherein the apparatus is caused to perform:
    superimposing, on the augmented reality display, an obstruction indicator symbol configured to depict a distance of the drone to a real object while the operator is looking towards the drone in air.

9. The apparatus of claim 8, wherein the obstruction indicator symbol comprises a visual indicator superimposed at least partly over the real object.

10. The apparatus of claim 1, wherein the apparatus is caused to perform:
    superimposing, on the augmented reality display, a map showing a geographic location of the operator, a geographic location of the drone, and a waypoint; and
    superimposing, on the augmented reality display a vertical waypoint symbol starting from a geographic location of the waypoint on the ground and extending towards a predetermined altitude of the waypoint while the operator is looking towards the drone in air.

11. The apparatus of claim 1, wherein the apparatus is caused to perform:
superimposing, on the augmented reality display, one or more visual elements based on data captured in real-time using one or more sensors onboard the drone in a vicinity of the target symbol while the operator is looking towards the drone in air; and
positioning, on the augmented reality display, the one or more visual elements so that a line of sight remains unobstructed while the operator is looking towards the drone in the air.

12. The apparatus of claim 1, wherein the apparatus is caused to perform:
superimposing, on the augmented reality display, a map in a vertical layout showing a geographic location of the operator and a geographic location of the drone in a vicinity of the target symbol on the augmented reality display while the operator is looking towards the drone in air; or
superimposing, on the augmented reality display, a map in a horizontal layout showing a geographic location of the operator and a geographic location of the drone while the operator is looking towards the ground.

13. The apparatus of claim 1, wherein the apparatus is caused to perform:
superimposing, on the augmented reality display, a menu structure around the operator while the operator is looking towards the ground;
detecting a gesture from the operator as a command related to the menu structure; and
controlling, on the augmented reality display, the display of the data related to the operation of the drone based on the command.

14. The apparatus of claim 1, wherein the apparatus comprises:
an external data communication interface configured to receive external data related to a physical environment of the drone;
wherein the apparatus is caused to perform:
superimposing, on the augmented reality display, one or more visualizations of the external data.

15. The apparatus of claim 14, wherein the external data comprises weather data, and the one or more visualizations depict the weather data.

16. The apparatus of claim 14, wherein the external data comprises air traffic control data including classifications of airspaces, and the one or more visualizations depict the classification of the airspace matching a position of the drone in the air.

17. The apparatus of claim 14, wherein the external data comprises air traffic control data including positions of aircraft in air, and the one or more visualizations depict the positions of the aircraft in the air.

18. The apparatus of claim 1, wherein the apparatus is caused to perform:
superimposing, on the augmented reality display, the data related to the operation of the drone while the operator is looking towards the drone in the air with a visual line of sight to the drone during an unobstructed visibility, or during an impaired visibility with an augmented line of sight to the drone, or during an obstructed visibility with an augmented and simulated line of sight to the drone, or during a long-distance visibility with an augmented line of sight to the drone.

19. The apparatus of claim 1, wherein the apparatus is caused to perform:
adjusting, on the augmented reality display, the display of the data related to the operation of the drone so that a line of sight remains unobstructed while the operator is looking towards the drone in air.

20. A system comprising two apparatuses of claim 1, wherein:
a first apparatus is used for assisting a first operator in operating the drone in air using the remote controller, wherein a first geographic location of the first operator in relation to a position of the drone in the air is used to adjust a first viewpoint for rendering the data related to the operation of the drone including a first target symbol and a first orientation symbol to be superimposed on a first augmented reality display of the first apparatus; and
a second apparatus is used for informing a second operator in relation to operating the drone in the air, wherein a second geographic location of the second operator in relation to the position of the drone in the air is used to adjust a second viewpoint for rendering the data related to the operation of the drone including a second target symbol and a second orientation symbol to be superimposed on a second augmented reality display of the second apparatus.

21. The system of claim 20, wherein the second apparatus is used for assisting the second operator in relation to controlling one or more sensors onboard the drone.

22. A method for assisting an operator in operating a drone using a remote controller, the method comprising:
receiving data related to the operation of the drone from the remote controller;
displaying, on an augmented reality display, the data related to the operation of the drone to the operator;
tracking a position, orientation, head direction, and gaze direction of the operator;
superimposing, on the augmented reality display, a target symbol indicating a position of the drone in a real world environment from a perspective of the operator while the operator is looking towards the drone, wherein the target symbol remains fixed to a world coordinate system position of the drone regardless of the position of the operator in such a way that if the operator moves to a new position, the target symbol is visible from a new perspective at the new position; and
superimposing, on the augmented reality display, an orientation symbol indicating an orientation of the drone from the perspective of the operator while the operator is looking towards the drone.

23. A non-transitory computer-readable medium comprising computer program code, which, when executed by one or more processors, causes performance of a method for assisting an operator in operating a drone using a remote controller, comprising:
receiving data related to the operation of the drone from the remote controller;
displaying, on an augmented reality display, the data related to the operation of the drone to the operator;
tracking a position, orientation, head direction, and gaze direction of the operator;
superimposing, on the augmented reality display, a target symbol indicating a position of the drone in a real world environment from a perspective of the operator while the operator is looking towards the drone, wherein the target symbol remains fixed to a world coordinate system position of the drone regardless of the position of the operator in such a way that if the operator moves to a new position, the target symbol is visible from a new perspective at the new position; and superimposing, on the augmented reality display, an orientation symbol indicating an orientation of the drone from the perspective of the operator while the operator is looking towards the drone.

\* \* \* \* \*